(12) United States Patent
Ba et al.

(10) Patent No.: US 11,980,879 B2
(45) Date of Patent: May 14, 2024

(54) ANION EXCHANGE POLYMERS AND MEMBRANES FOR ELECTROLYSIS

(71) Applicant: UOP LLC, Des Plaines, IL (US)

(72) Inventors: Chaoyi Ba, Schaumburg, IL (US); Chunqing Liu, Arlington Heights, IL (US); Xueliang Dong, Schaumburg, IL (US)

(73) Assignee: UOP LLC, Des Plaines, IL (US)

( * ) Notice: Subject to any disclaimer, the term of this patent is extended or adjusted under 35 U.S.C. 154(b) by 84 days.

(21) Appl. No.: 17/474,198

(22) Filed: Sep. 14, 2021

(65) Prior Publication Data
US 2023/0102700 A1    Mar. 30, 2023

(51) Int. Cl.
*H01M 8/04* (2016.01)
*B01J 41/13* (2017.01)
(Continued)

(52) U.S. Cl.
CPC .......... *B01J 41/13* (2017.01); *C08G 73/0627* (2013.01); *C08J 5/2231* (2013.01); *C25B 1/04* (2013.01);
(Continued)

(58) Field of Classification Search
CPC ..................................................... H01M 8/04
See application file for complete search history.

(56) References Cited

U.S. PATENT DOCUMENTS

| | | |
|---|---|---|
| 4,931,182 A | 6/1990 | Burgoyne, Jr. et al. |
| 7,485,173 B1 | 2/2009 | Liu et al. |

(Continued)

FOREIGN PATENT DOCUMENTS

| | | |
|---|---|---|
| CN | 104425829 A | 3/2015 |
| CN | 109320692 A | 2/2019 |

(Continued)

OTHER PUBLICATIONS

Schonberger et al. ("Novel Multiblock-co-Ionomers as Potential Polymer Electrolyte Membrane Materials" Wiley Interscience talk published Jun. 22, 2007).*

(Continued)

*Primary Examiner* — Matthew W Van Oudenaren

(57) ABSTRACT

Anion exchange polymers having high OH⁻ conductivity, chemical stability, and mechanical stability have been developed for use in AEMs. The anion exchange polymers have stable hydrophobic polymer backbones, stable hydrophilic quaternary ammonium cationic groups, and hydrophilic phenolic hydroxyl groups on the polymer side chains. The polymers have polymer backbones free of ether bonds, hydrophilic polymer side chains, and piperidinium ion-conducting functionality, which enables efficient and stable operation in water or $CO_2$ electrolysis, redox flow battery, and fuel cell applications. The polymer comprises a plurality of repeating units of formula (I)

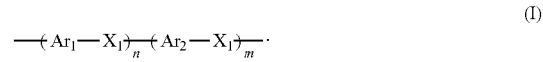

Anion exchange membranes and membrane electrode assemblies incorporating the anion exchange polymers are also described.

20 Claims, 3 Drawing Sheets

(51) Int. Cl.
| | |
|---|---|
| *C08G 73/06* | (2006.01) |
| *C08J 5/22* | (2006.01) |
| *C25B 1/04* | (2021.01) |
| *C25B 11/032* | (2021.01) |
| *C25B 13/08* | (2006.01) |
| *H01M 8/1004* | (2016.01) |
| *H01M 8/103* | (2016.01) |

(52) U.S. Cl.
CPC ............ *C25B 11/032* (2021.01); *C25B 13/08* (2013.01); *H01M 8/1004* (2013.01); *H01M 8/103* (2013.01); *C08J 2379/02* (2013.01)

(56) References Cited

U.S. PATENT DOCUMENTS

| | | |
|---|---|---|
| 9,580,824 B2 | 2/2017 | Masel et al. |
| 10,435,504 B2 | 10/2019 | Bae et al. |
| 2005/0268783 A1 | 12/2005 | Koros et al. |
| 2009/0178561 A1 | 7/2009 | Miller et al. |
| 2009/0182097 A1 | 7/2009 | Miller et al. |
| 2020/0308341 A1 | 10/2020 | Yan et al. |

FOREIGN PATENT DOCUMENTS

| | | |
|---|---|---|
| CN | 109384908 A | 2/2019 |
| CN | 110862516 A | 3/2020 |
| CN | 110903449 A | 3/2020 |
| CN | 112175170 A | 1/2021 |
| CN | 113583279 A | 11/2021 |
| CN | 113956445 A | 1/2022 |
| JP | 2016218140 A | 12/2016 |
| KR | 101546651 B1 | 8/2015 |
| KR | 20210071810 A | 6/2021 |
| WO | 2017190234 A1 | 11/2017 |
| WO | 2019076860 A1 | 4/2019 |
| WO | 2021172706 A1 | 9/2021 |

OTHER PUBLICATIONS

Wang, Junhua et al., Poly(arly piperidinium) membranes and ionomers for hydroxide exchange membrane fuel cells, Nature Energy, htt'ps://doi.org/10.1038/s41560-019-0372-8.

Ye Liu et al., Chemical cross-linking modification of polyimide membranes for gas separation, Journal of Membrane Science 189 (2001) 231-239.

Chien-Chiang Chen et al., Plasticization-resistant hollow fiber membranes for CO2/CH4 separation based on a thermally crosslinkable polyimide, Journal of Membrane Science 382 (2011) 212-221.

Liu, Chunqing et al., U.S. Appl. No. 17/388,950, filed Jul. 29, 2021, entitled Ionically Conductive Asymmetric Composite Membranes for Electrochemical Energy Storage Applications.

Liu, Chunqing et al., U.S. Appl. No. 17/388,956, filed Jul. 29, 2021, entitled Sandwich-Structured Thin Film Composite Anion Exchange Membrane for Redox Battery Applications.

Liu, Chunqing et al., U.S. Appl. No. 17/389,032, filed Jul. 29, 2021, entitled Ionically Conductive Thin Film Composite Membranes for Energy Storage Applications.

Liu, Chunqing et al., U.S. Appl. No. 17/388,962, filed Jul. 29, 2021, entitled Electrolyte Compositions for Redox Flow Batteries.

International Search Report from corresponding PCT application No. PCT/US2022/076294, dated Dec. 27, 2022.

Written Opinion from corresponding PCT application No. PCT/US2022/076294, completed on Dec. 27, 2022.

International Search Report from PCT application No. PCT/IB2022/078207, dated Feb. 1, 2023.

Written Opinion from PCT application No. PCT/IB2022/078207, completed Jan. 31, 2023.

Ryu, T. et al., Synthethis and characterization of block copolymer and comparative study with random copolymer via superacid-catalyzed reaction, International journal of hydrogen energy, 2018, vol. 43, pp. 11862-11871. NEED.

Lee, S. et al., Synthesis and properties of sulfonated poly(N-methylisatin-biphenylene) proton exchange membrane by superacid-catalyzed polymerization, International journal of hydrogen energy, 2015, vol. 40, pp. 5390-5395. NEED.

International Search Report from PCT application No. PCT/IB2022/078205, dated Feb. 10, 2023.

Written Opinion from PCT application No. PCT/IB2022/078205, completed Feb. 10, 2023.

International Search Report from PCT application number PCT/US2023/021186 mailed Aug. 28, 2023.

Written Opinion from PCT application number PCT/US2023/021186 mailed Aug. 28, 2023.

* cited by examiner

ANION EXCHANGE POLYMERS AND MEMBRANES FOR ELECTROLYSIS

BACKGROUND

Hydrogen as an energy vector for grid balancing or power-to-gas and power-to-liquid processes plays an important role in the path toward a low-carbon energy structure that is environmentally friendly. Water electrolysis produces high quality hydrogen by electrochemical splitting of water into hydrogen and oxygen; the reaction is given by Eq. 1 below. The water electrolysis process is an endothermic process and electricity is the energy source. Water electrolysis has zero carbon footprint when the process is operated by renewable power sources, such as wind, solar, or geothermal energy. The main water electrolysis technologies include alkaline electrolysis, proton exchange membrane (PEM) water electrolysis (PEMWE as shown in FIG. 1), anion exchange membrane (AEM) water electrolysis (AEMWE as shown in FIG. 2), and solid oxide water electrolysis.

As shown in FIG. 1, in a PEMWE system 100, an anode 105 and a cathode 110 are separated by a solid PEM electrolyte 115 such as a sulfonated tetrafluoroethylene based cofluoropolymer sold under the trademark Nafion® by Chemours company. The anode and cathode catalysts typically comprise $IrO_2$ and Pt, respectively. At the positively charged anode 105, pure water 120 is oxidized to produce oxygen gas 125, electrons (e), and protons; the reaction is given by Eq. 2. The protons are transported from the anode 105 to the cathode 110 through the PEM 115 that conducts protons. At the negatively charged cathode 110, a reduction reaction takes place with electrons from the cathode 110 being given to protons to form hydrogen gas 130; the reaction is given by Eq. 3. The PEM 115 not only conducts protons from the anode 105 to the cathode 110, but also separates the $H_2$ gas 130 and $O_2$ gas 125 produced in the water electrolysis reaction. PEM water electrolysis is one of the favorable methods for conversion of renewable energy to high purity hydrogen with the advantage of compact system design at high differential pressures, high current density, high efficiency, fast response, small footprint, lower temperature (20-90° C.) operation, and high purity oxygen byproduct. However, one of the major challenges for PEM water electrolysis is the high capital cost of the cell stack comprising expensive acid-tolerant stack hardware such as the Pt-coated Ti bipolar plates, expensive noble metal catalysts required for the electrodes, as well as the expensive PEM.

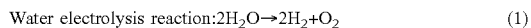

Water electrolysis reaction: $2H_2O \rightarrow 2H_2 + O_2$ (1)

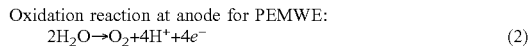

Oxidation reaction at anode for PEMWE:
$2H_2O \rightarrow O_2 + 4H^+ + 4e^-$ (2)

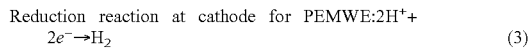

Reduction reaction at cathode for PEMWE: $2H^+ + 2e^- \rightarrow H_2$ (3)

AEMWE is a developing technology. As shown in FIG. 2, in the AEMWE system 200, an anode 205 and a cathode 210 are separated by a solid AEM electrolyte 215. Typically, a water feed 220 with an added electrolyte such as dilute KOH or $K_2CO_3$ or a deionized water is fed to the cathode side. The anode and cathode catalysts typically comprise platinum metal-free Ni-based or Ni alloy catalysts. At the negatively charged cathode 210, water is reduced to form hydrogen 225 and hydroxyl ions by the addition of four electrons; the reaction is given by Eq. 4. The hydroxyl ions diffuse from the cathode 210 to the anode 205 through the AEM 215 which conducts hydroxyl ions. At the positively charged anode 205, the hydroxyl ions recombine as water and oxygen 230; the reaction is given by Eq. 5. The AEM 215 not only conducts hydroxyl ions from the cathode 210 to the anode 205, but also separates the $H_2$ 225 and $O_2$ 230 produced in the water electrolysis reaction. The AEM 215 allows the hydrogen 225 to be produced under high pressure up to about 35 bar with very high purity of at least 99.9%.

Reduction reaction at cathode for AEMWE: $4H_2O + 4e^- \rightarrow 2H_2 + 4OH^-$ (4)

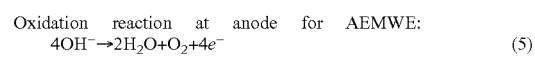

Oxidation reaction at anode for AEMWE:
$4OH^- \rightarrow 2H_2O + O_2 + 4e^-$ (5)

AEMWE has an advantage over PEMWE because it permits the use of less expensive platinum metal-free catalysts, such as Ni and Ni alloy catalysts. In addition, much cheaper stainless steel bipolar plates can be used in the gas diffusion layers (GDL) for AEMWE, instead of the expensive Pt-coated Ti bipolar plates currently used in PEMWE. However, the largest impediments to the development of AEM systems are membrane hydroxyl ion conductivity and stability, as well as lack of understanding of how to integrate catalysts into AEM systems. Research on AEMWE in the literature has been focused on developing electrocatalysts, AEMs, and understanding the operational mechanisms with the general objective of obtaining a high efficiency, low cost and stable AEMWE technology.

Fuel cells, as a next generation clean energy resource, convert the energy of chemical reactions such as an oxidation/reduction redox reaction of hydrogen and oxygen into electric energy. The three main types of fuel cells are alkaline electrolyte fuel cells, polymer electrolyte membrane fuel cells, and solid oxide fuel cells. Polymer electrolyte membrane fuel cells may include proton exchange membrane fuel cells (PEMFC), anion exchange membrane fuel cells (AEMFC), and direct methanol fuel cells. PEMFC uses a PEM to conduct protons from the anode to the cathode, and it also separates the $H_2$ and $O_2$ gases to prevent gas crossover. AEMFC uses an AEM to conduct $OH^-$ from the cathode to the anode, and it also separates the $H_2$ and $O_2$ gases to prevent gas crossover.

The anode in an electrochemical cell is the electrode at which the predominant reaction is oxidation (e.g., the water oxidation/oxygen evolution reaction electrode for a water electrolyzer, or the hydrogen oxidation electrode for a fuel cell). The cathode in an electrochemical cell is the electrode at which the predominant reaction is reduction (e.g., the proton reduction/hydrogen evolution reaction electrode for a water electrolyzer, or the oxygen reduction electrode for a fuel cell). The membrane is one of the key materials that make up an electrolysis cell or a fuel cell and is an important driver for safety and performance. Some important properties for membranes for fuel cells and membrane electrolysis include high conductivity, high ionic permeability, high ionic exchange capacity (for ion-exchange membrane), high ionic/$H_2$ and $O_2$ selectivity (low $H_2$ and $O_2$ permeability/crossover), low price, low area resistance to minimize efficiency loss resulting from ohmic polarization, high resistance to oxidizing and reducing conditions, being chemically inert at a wide pH range, high thermal stability together with high proton conductivity, and high mechanical strength (thickness, low swelling).

Significant advances are needed in cost-effective, high performance, stable catalysts, membrane materials, as well as other cell stack components for AEM water electrolysis and AEMFCs with a wide range of applications in renewable energy systems.

DESCRIPTION OF THE INVENTION

Figure 1:
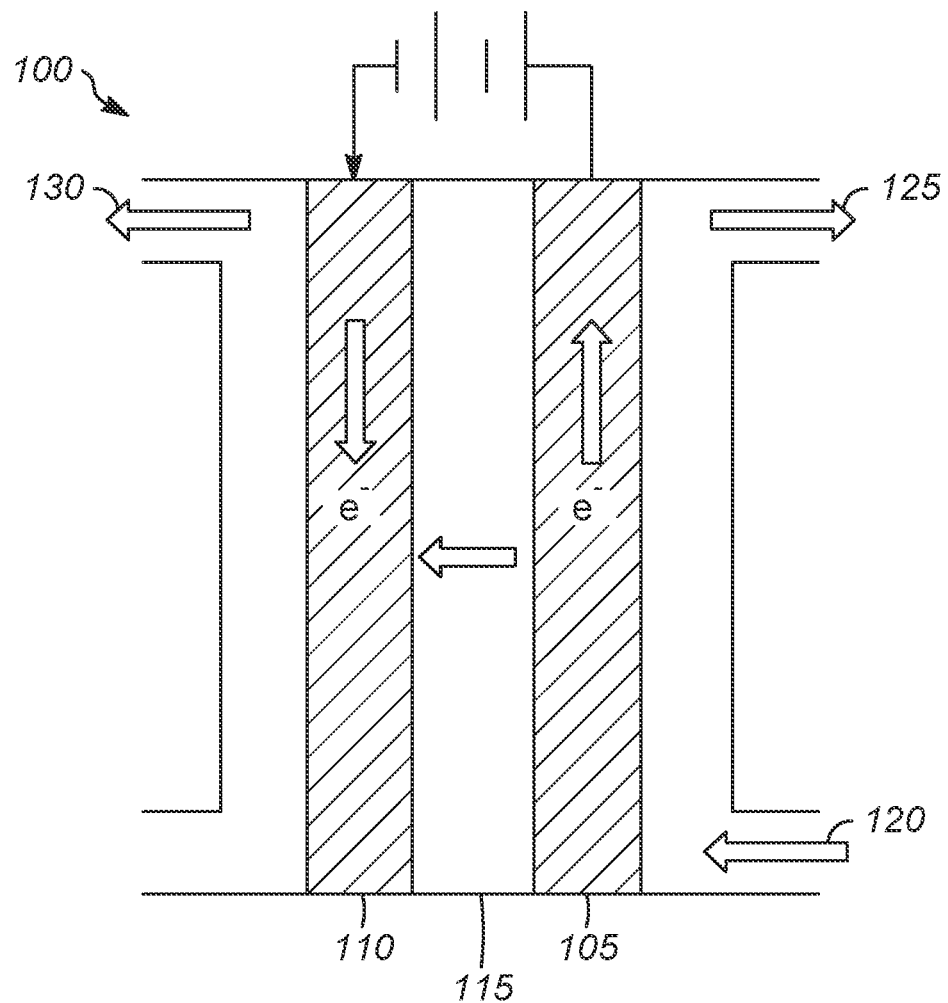
FIG. 1 is an illustration of one embodiment of a PEMWE cell.
Figure 2:
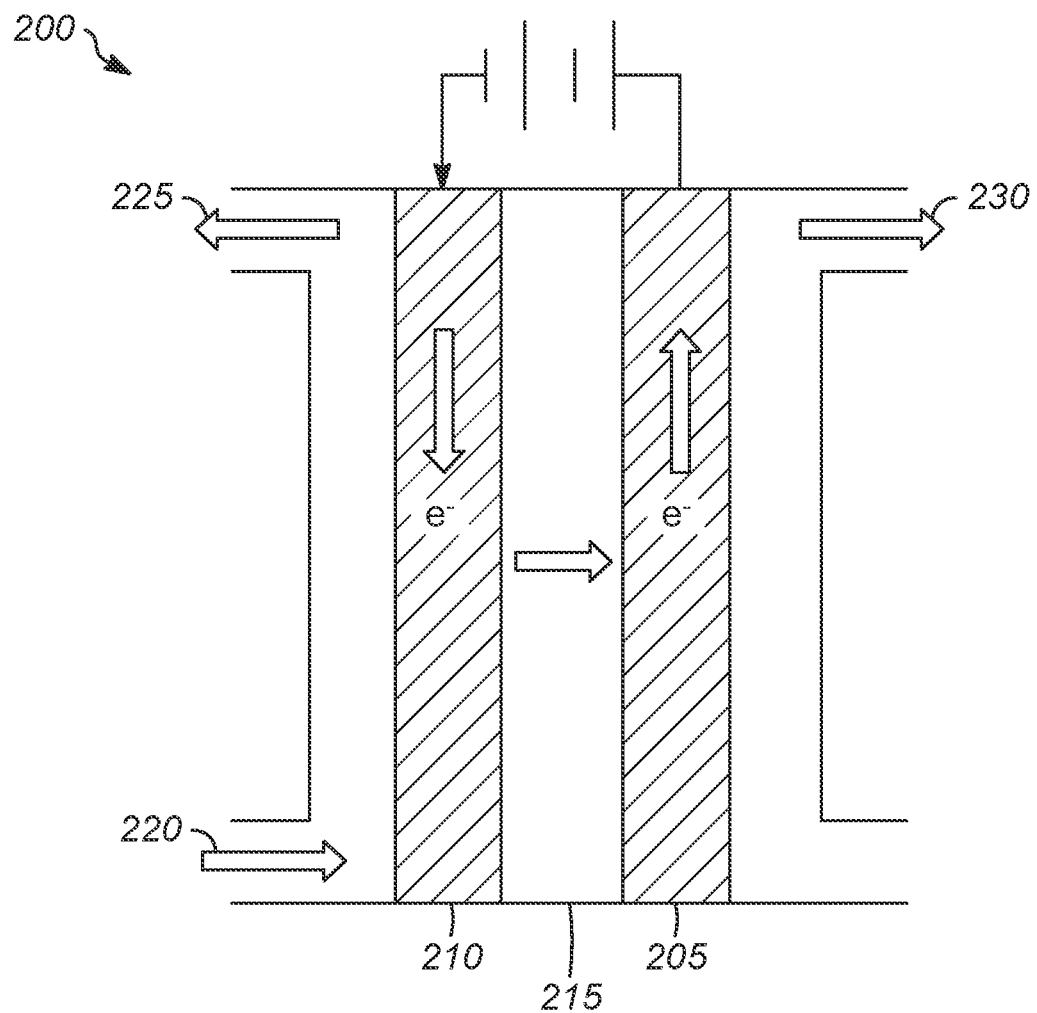
FIG. 2 is an illustration of one embodiment of a AEMWE cell.

Novel anion exchange polymers with phenolic hydroxyl groups have been developed for the preparation of AEMs which combine high $OH^-$ conductivity, chemical stability, and mechanical stability for electrolysis, such as water or $CO_2$ electrolysis, as well as other uses such as redox flow batteries, and fuel cell applications.

The anion exchange polymers have stable hydrophobic polymer backbones, stable hydrophilic quaternary ammonium cationic groups, and hydrophilic phenolic hydroxyl groups on the polymer side chains. Therefore, these polymers can provide high OH-conductivity, high chemical stability, low swelling in alkaline water at about 60-120° C., and high mechanical stability. Cationic groups, like piperidinium or piperidinium salt, were covalently incorporated into the polymers for the preparation of novel AEMs.

The anion exchange polymers were designed to: 1) enhance $OH^-$ conductivity by incorporating piperidinium or piperidinium salt into the polymer side chain and increasing the polymer hydrophilicity by introducing hydrophilic functional groups such as —OH groups to the polymer side chains; 2) improve the chemical stability of the polymer by having an polymer backbone free of ether bonds; and 3) increase polymer backbone rigidity and molecular weight to enhance the mechanical strength of the polymer. The polymers have polymer backbones free of ether bonds, hydrophilic polymer side chains, and piperidinium ion-conducting functionality, which enables efficient and stable operation in water or $CO_2$ electrolysis, redox flow battery, and fuel cell applications.

One aspect of the invention is an anion exchange polymer. In one embodiment, the polymer comprises a plurality of repeating units of formula (I)

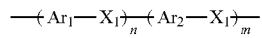

(I)

wherein $Ar_1$ is selected from the group consisting of:

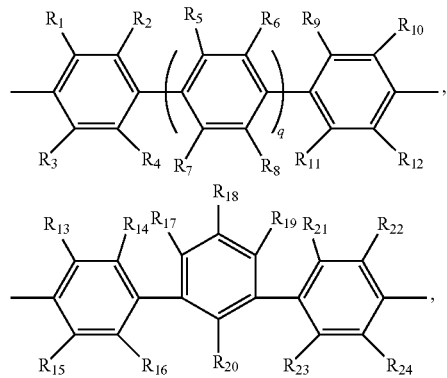

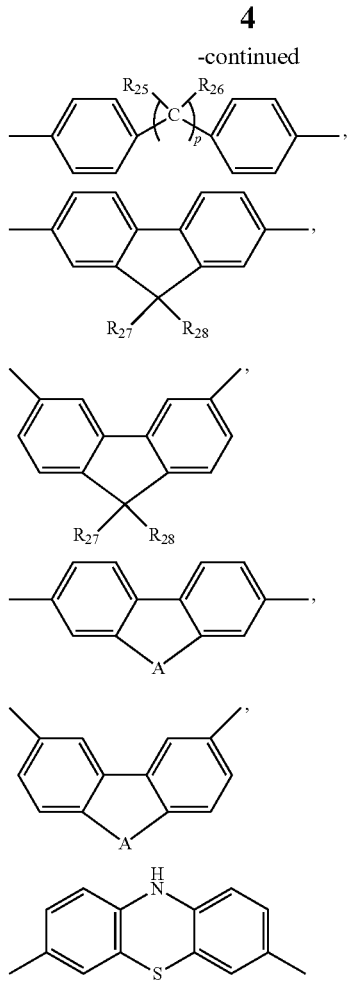

and mixtures thereof;

$Ar_2$ is selected from the group consisting of:

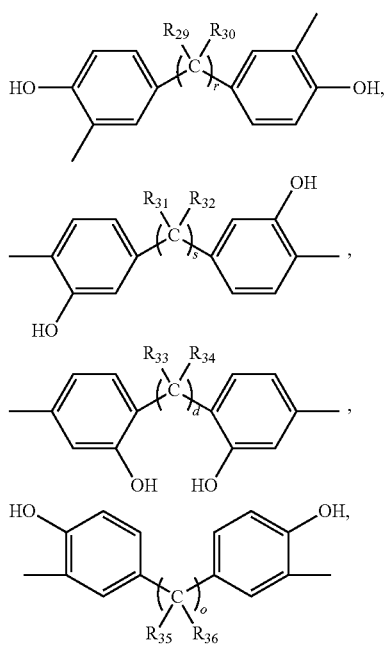

-continued

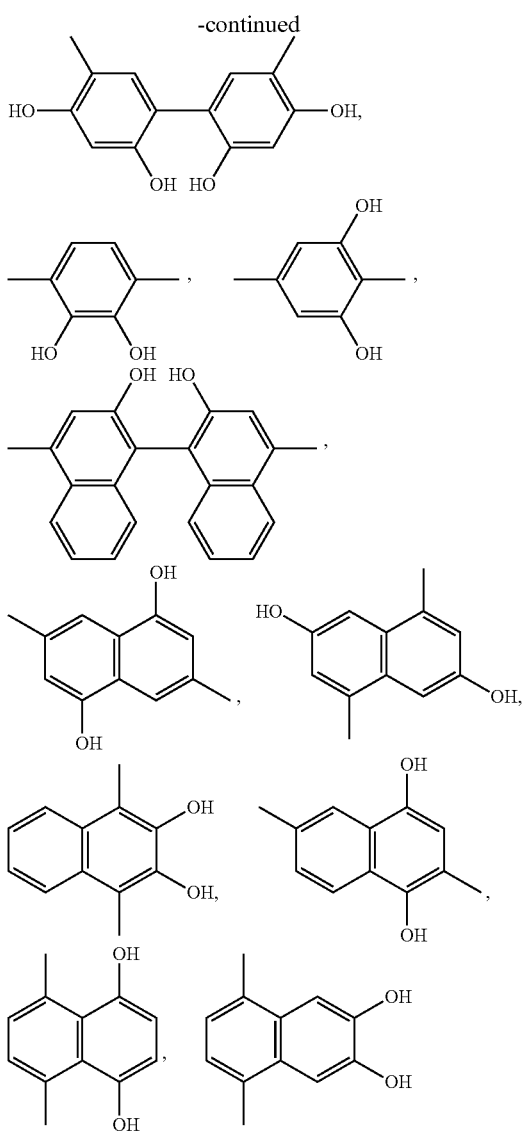

and mixtures thereof;
X₁ is selected from the group consisting of:

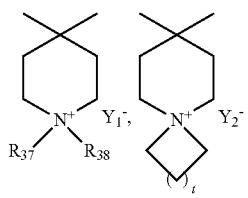

optionally

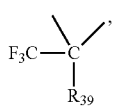

and mixtures thereof.

wherein $Y_1^-$ and $Y_2^-$ are anions;
wherein $R_1$-$R_{36}$ are each independently hydrogen, a halide, an alkyl group, an alkenyl group, an alkynyl group, or an aryl group, and the alkyl, alkenyl, alkynyl, or aryl groups are optionally substituted with a halide or a positively charged functional group;
wherein $R_{37}$ and $R_{38}$ are each independently hydrogen, an alkyl group, an alkenyl group, an alkynyl group, or an aryl group, and the alkyl, alkenyl, alkynyl or aryl groups are optionally substituted with a halide or a positively charged functional group;
wherein $R_{39}$ is an alkyl group, an alkenyl group, an alkynyl group, or an aryl group, and the alkyl, alkenyl, alkynyl or aryl group is optionally substituted with a halide or a positively charged functional group;
wherein A is O or S;
wherein m and n are independently integers from 5 to 500 and the molar ratio of n/m is in a range of 1:20 to 20:1;
wherein p is 1, 2, 3, or 4;
wherein q is 0, 1, 2, or 3;
wherein r, s, d, and o are independently 0, 1, 2, or 3; and
wherein t is 1, 2, 3, 4, 5, or 6.

In some embodiments, $Ar_1$ is selected from the group consisting of

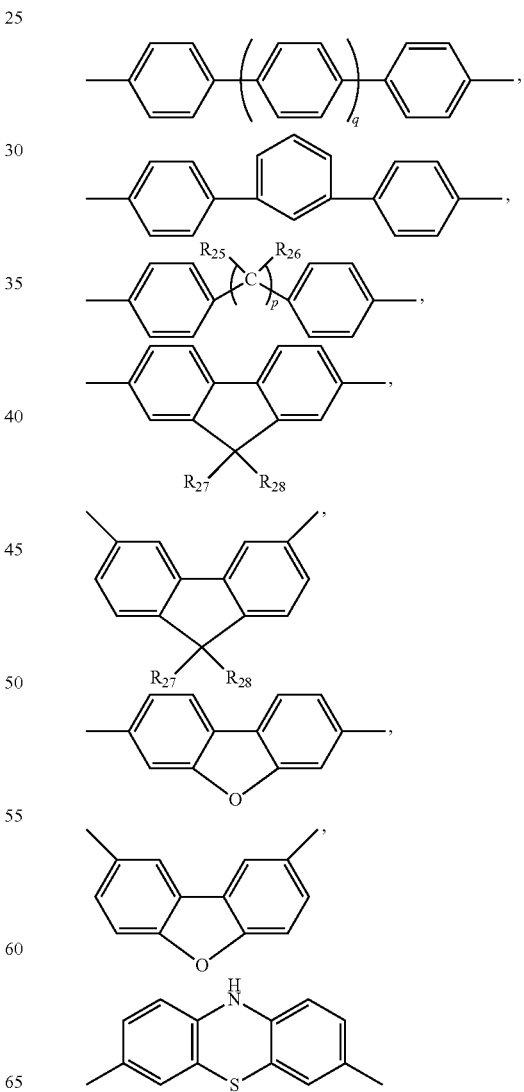

and mixtures thereof, wherein $R_{25}$, $R_{26}$, $R_{27}$, and $R_{28}$ are each independently —H or —CH$_3$;

wherein p is 1 or 2; and wherein q is 0 or 1.

In some embodiments, $Ar_2$ is selected from the group consisting of

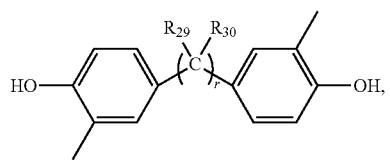

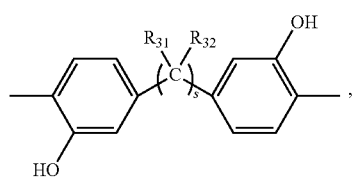

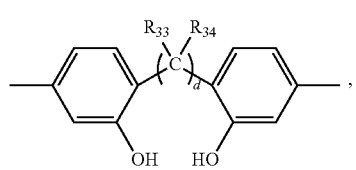

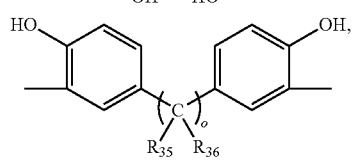

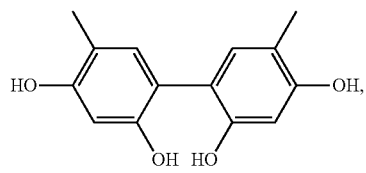

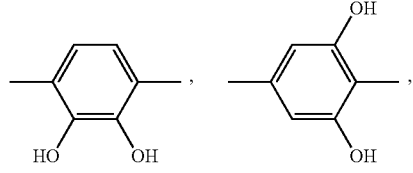

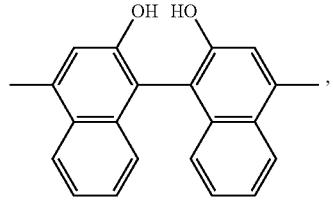

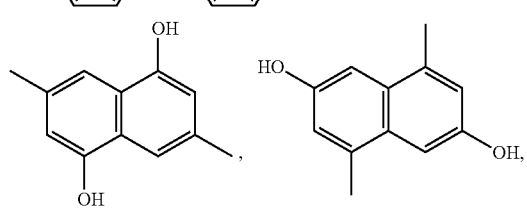

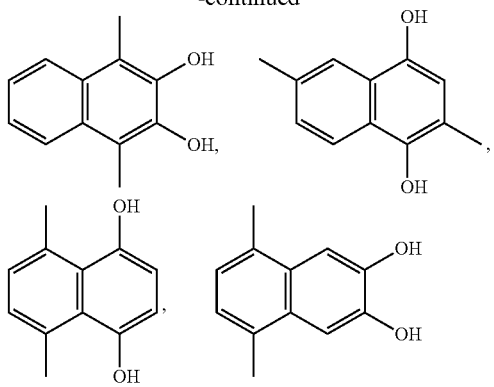

and mixtures thereof;

wherein $R_{29}$, $R_{30}$, $R_{31}$, $R_{32}$, $R_{33}$, $R_{34}$, $R_{35}$, and $R_{36}$ are each independently —CH$_3$ or —CF$_3$;

wherein r, s, d, and o are each independently 0 or 1.

In some embodiments, $X_1$ is

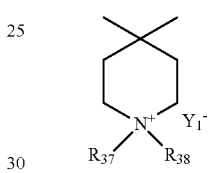

and wherein $R_{37}$ and $R_{38}$ are each independently —H, —CH$_3$, —CH$_2$CH$_3$, —CH(CH$_3$)$_2$, —C(CH$_3$)$_3$, —CH$_2$—C$_6$H$_5$, or —CH$_2$—CH(CH$_3$)$_2$, and wherein $Y_1^-$ is OH$^-$ or I$^-$.

In some embodiments, $X_1$ is

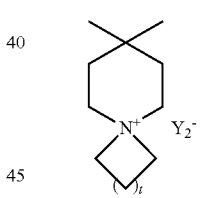

wherein t is 1, 2, 3, 4, 5, or 6, and wherein $Y_2^-$ is OH$^-$ or I$^-$.

In some embodiments, $X_1$ is a mixture of

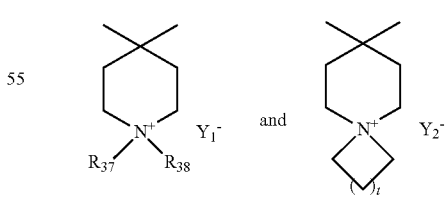

wherein $R_{37}$ and $R_{38}$ are each independently —H, —CH$_3$, —CH$_2$CH$_3$, —CH(CH$_3$)$_2$, —C(CH$_3$)$_3$, —CH$_2$—C$_6$H$_5$, or —CH$_2$—CH(CH$_3$)$_2$, wherein t is 1, 2, 3, 4, 5, or 6, and wherein $Y_1^-$ and $Y_2^-$ are the same and are selected from OH$^-$ or I$^-$.

In some embodiments, $X_1$ is a mixture of

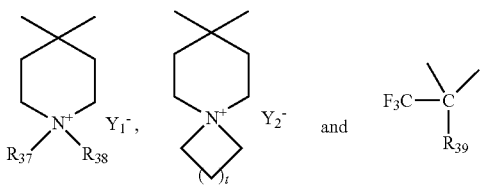

wherein $R_{37}$ and $R_{38}$ are each independently —H, —CH$_3$, —CH$_2$CH$_3$, —CH(CH$_3$)$_2$, —C(CH$_3$)$_3$, —CH$_2$—C$_6$H$_5$, or —CH$_2$—CH(CH$_3$)$_2$;
wherein t is 1, 2, 3, 4, 5, or 6;
wherein $Y_1^-$ and $Y_2^-$ are the same and are selected from OH$^-$ or I$^-$; and
wherein $R_{39}$ is —CH$_3$, —CH$_2$CH$_3$, —C$_6$H$_5$, or —(CH$_2$)$_5$—N$^+$(CH$_3$)$_3$.

In some embodiments, the polymer comprising a plurality of repeating units of formula (I) is formed from a superacid catalyzed polyhydroxyalkylation reaction of monomers Ar$_1$', Ar$_2$', and X$_1$', followed by a Menshutkin reaction, wherein Ar$_1$' is selected from the group consisting of:

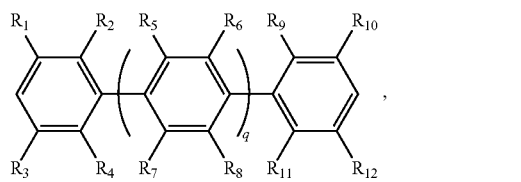

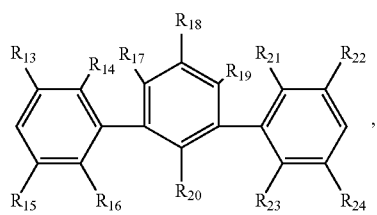

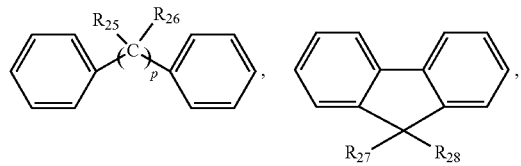

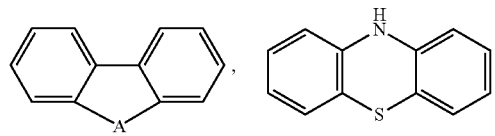

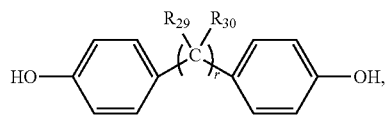

and mixtures thereof;
Ar$_2$' is selected from the group consisting of:

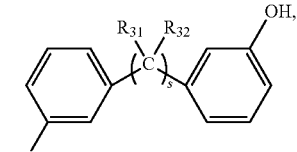

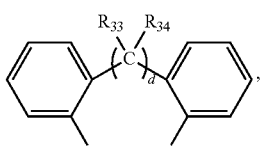

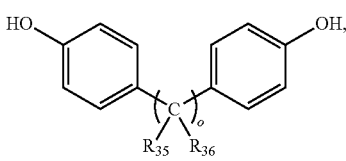

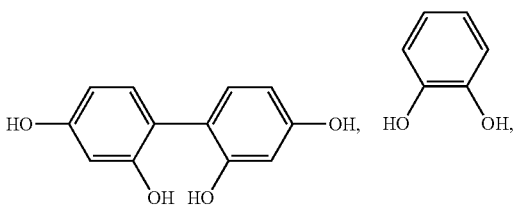

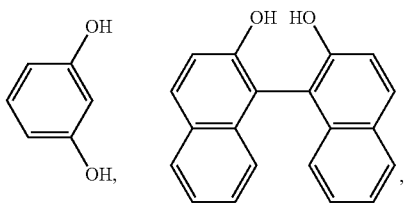

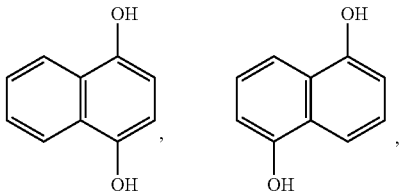

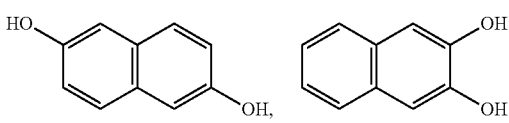

and mixtures thereof; and
X$_1$' is selected from the group consisting of:

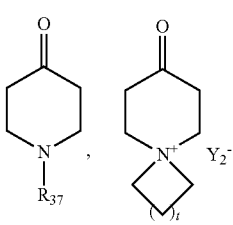

optionally

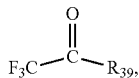

and mixtures thereof.

In some embodiments, Ar$_1$' is selected from the group consisting of:

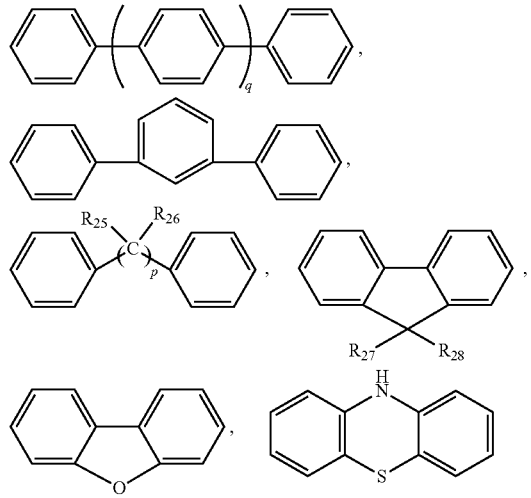

and mixtures thereof, wherein R$_{25}$, R$_{26}$, R$_{27}$, and R$_{28}$ are each independently —H or —CH$_3$;

wherein p is 1 or 2; and wherein q is 0 or 1.

In some embodiments, Ar$_2$' is selected from the group consisting of:

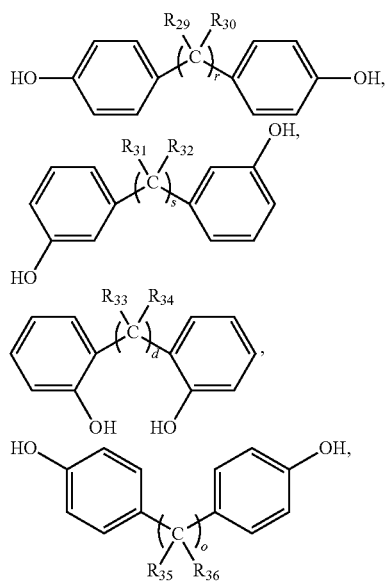

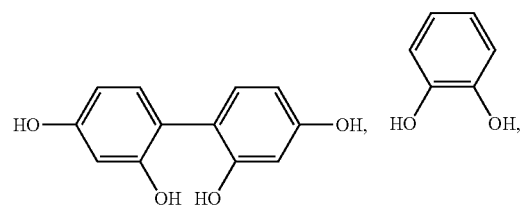

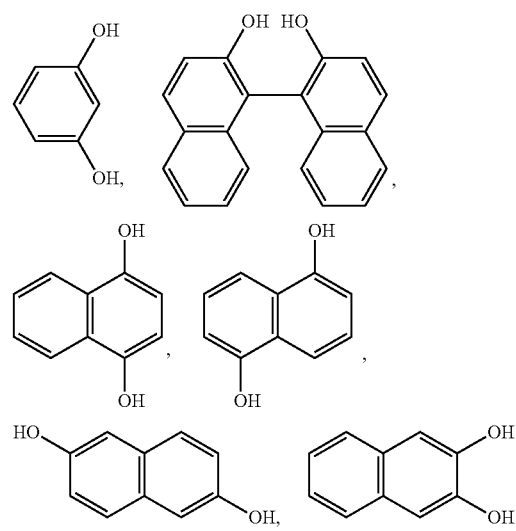

and mixtures thereof;

wherein R$_{29}$, R$_{30}$, R$_{31}$, R$_{32}$, R$_{33}$, R$_{34}$, R$_{35}$, and R$_{36}$ are each independently —CH$_3$ or —CF$_3$;

wherein r, s, d, and o are independent 0 or 1.

In some embodiments, X$_1$' is

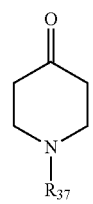

and wherein R$_{37}$ is —H, —CH$_3$, —CH$_2$CH$_3$, —CH(CH$_3$)$_2$, —C(CH$_3$)$_3$, —CH$_2$—C$_6$H$_5$, or —CH$_2$—CH(CH$_3$)$_2$.

In some embodiments, X$_1$' is

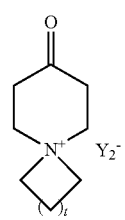

and wherein t is 1, 2, 3, 4, 5, or 6.

In some embodiments, $X_1'$ is a mixture of

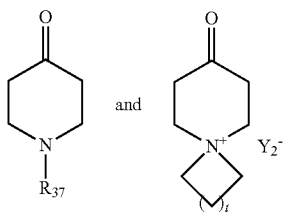

wherein $R_{37}$ is —H, —$CH_3$, —$CH_2CH_3$, —$CH(CH_3)_2$, —$C(CH_3)_3$, —$CH_2$—$C_6H_5$, or —$CH_2$—$CH(CH_3)_2$; and wherein t is 1, 2, 3, 4, 5, or 6.

In some embodiments, $X_1'$ is a mixture of

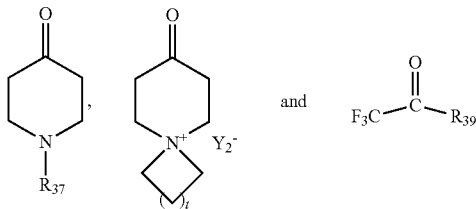

wherein $R_{37}$ is —H, —$CH_3$, —$CH_2CH_3$, —$CH(CH_3)_2$, —$C(CH_3)_3$, —$CH_2$—$C_6H_5$, or —$CH_2$—$CH(CH_3)_2$;
wherein $R_{39}$ is —$CH_3$, —$CH_2CH_3$, —$C_6H_5$, or —$(CH_2)_5$—$N^+(CH_3)_3$; and
wherein t is 1, 2, 3, 4, 5, or 6.

The anion exchange polymer comprising a plurality of repeating units of formula (I) may be synthesized by two steps: 1) a superacid catalyzed polyhydroxyalkylation reaction of monomers $Ar_1'$ and $Ar_2'$ with $X_1'$, such as p-terphenyl as $Ar_1'$ and 4,4-dihydroxybiphenyl as $Ar_2'$ with N-methyl-4-piperidone as $X_1'$, to form a neutral precursor polymer; and 2) a Menshutkin reaction to convert the neutral precursor polymer comprising piperidine-based groups to the anion exchange polymer comprising a plurality of repeating units of formula (I) with piperidinium-based cation groups. Optionally, the anion exchange polymer comprising a plurality of repeating units of formula (I) with piperidinium-based cation groups and negatively charged halide ions is converted to an anion exchange polymer comprising a plurality of repeating units of formula (I) with piperidinium-based cation groups and negatively charged $OH^-$ ions by soaking in a base solution before the polymer is made into a membrane.

The polyhydroxyalkylation reaction of monomers $Ar_1'$ and $Ar_2'$ with monomer $X_1'$ provides an anion exchange polymer with a polymer backbone free of ether bonds, which results in high chemical stability of the polymer. The incorporation of electron-rich monomer $Ar_1'$ into the anion exchange polymer provides a hydrophobic polymer backbone and the incorporation of monomer $Ar_2'$ with phenolic hydroxyl functional groups into the anion exchange polymer provides hydrophilic polymer side chains. The incorporation of monomer $X_1'$ into the anion exchange polymer provides the polymer with piperidinium-based anion exchange property that is critical to achieve stable high $OH^-$ conductivity. In some cases, the monomer $X_1'$ is a mixture of a piperidone-based monomer and a non-piperidone-based monomer to enable the formation of a high molecular weight anion exchange polymer. The combination of the hydrophobic polymer backbone, the hydrophilic polymer side chains, and alkaline stable piperidinium functional cation groups provides the novel anion exchange polymer with high $OH^-$ conductivity, high chemical stability, high mechanical strength, and long-term performance stability. The molar ratio of $Ar_1'$ monomer to $Ar_2'$ monomer can be in a range of 20:1 to 1:20, or in a range of 10:1 to 1:10, or in a range of 5:1 to 1:5. The molar ratio of $X_1'$ monomer to $Ar_1'$ and $Ar_2'$ monomers can be in a range of 1.2:1 to 1:1.2, or in a range of 1.1:1 to 1:1.1, or in a range of 1.05:1 to 1:1.05.

The superacid catalyzed polyhydroxyalkylation reaction can be carried out at 0° C. to 50° C., or at 10° C. to 30° C., or at 20° C. to 30° C. for 2 h to 72 h, or 10 h to 48 h, or 12 to 24 h. Suitable superacid catalysts include, but are not limited to, trifluoromethanesulfonic acid ($CF_3SO_3H$ (TFSA)), methanesulfonic acid (MSA), fluorosulfuric acid ($FSO_3H$), or mixtures thereof. Solvents for the polyhydroxyalkylation reaction are those that can dissolve one or more of the monomers. Suitable solvents include, but are not limited to, methylene chloride, chloroform, trifluoroacetic acid (TFA), or mixtures thereof.

The Menshutkin reaction is used to react the neutral precursor polymer comprising piperidine-based groups with an alkyl halide to convert the neutral piperidine-based groups to piperidinium-based cation groups to form the anion exchange polymer comprising a plurality of repeating units of formula (I) with piperidinium-based cation groups. Suitable alkyl halides include, but are not limited to, alkyl iodides or alkyl bromides. The Menshutkin reaction can be carried out at 10° C. to 80° C., or at 20° C. to 30° C. for 2 h to 72 h, or 10 h to 48 h, or 12 to 24 h. Solvents for the Menshutkin reaction are those that can dissolve the neutral precursor polymer comprising piperidine-based groups. Suitable solvents include, but are not limited to, N-methylpyrrolidone (NMP), N,N-dimethyl acetamide (DMAC), N,N-dimethylformamide (DMF), dimethyl sulfoxide (DMSO), 1,3-dioxolane, or mixtures thereof.

The anion exchange polymer comprising a plurality of repeating units of formula (I) has a weight average molecular weight in a range of 10,000 to 1,000,000 Daltons, or in a range of 50,000 to 500,000 Daltons.

Another aspect of the invention is an anion exchange membrane comprising the polymer described above. The anion exchange membrane may be used in a wide variety of applications including, but not limited to, fuel cells, electrolyzers, flow batteries, electrodialyzers, waste metal recovery systems, electrocatalytic hydrogen production systems, desalinators, water purifiers, waste water treatment systems, ion exchangers, or $CO_2$ separators.

In some embodiments, the anion exchange membrane comprises a nonporous symmetric dense film membrane, an integrally-skinned asymmetric membrane, a reinforced composite membrane, or a thin film composite membrane. By "dense" we mean that the membrane does not have pores larger than 1 nm.

In some embodiments, the reinforced composite membrane or the thin film composite membrane comprises a porous substrate membrane impregnated or coated with the anion exchange polymer. The porous substrate membrane is prepared from a polymer different from the anion exchange polymer.

In some embodiments, the nonporous symmetric dense film membrane, the integrally-skinned asymmetric membrane, the reinforced composite membrane, or the thin film composite membrane may be a flat sheet membrane.

In some embodiments, the nonporous symmetric dense film anion exchange membrane is prepared using a method comprising: 1) dissolving the anion exchange polymer in a solvent to form a polymer casting solution; 2) casting the polymer casting solution on a nonporous substrate to form a uniform layer of the polymer casting solution; 3) drying the polymer casting solution layer to form a dried membrane on the nonporous substrate at 50° C. to 180° C., or at 50° C. to 120° C., or at 80° C. to 120° C.; and optionally 4) ion exchanging the halide anions of the anion exchange polymer in the membrane with hydroxide, bicarbonate, carbonate ions, or a combination thereof to form the nonporous symmetric dense film anion exchange polymer membrane. The nonporous substrate is removed from the membrane when the membrane is used in a desired application. The solvent used to dissolve the anion exchange polymer can be selected from, but is not limited to, NMP, DMAc, DMF, DMSO, 1,3-dioxolane, or mixtures thereof. The nonporous substrate used for the fabrication of the nonporous symmetric dense film membrane can be selected from, but is not limited to, glass plate, polyolefin film, polyester film, or fluorocarbon-based polymer film such as poly(tetrafluoroethylene) (PTFE) and poly(vinylidene fluoride) (PVDF) film.

In some embodiments, the integrally-skinned asymmetric anion exchange membrane is prepared using a method comprising: 1) making an anion exchange polymer membrane casting solution comprising the anion exchange polymer with formula (I), solvents which are miscible with water and can dissolve the anion exchange polymer, and non-solvents which cannot dissolve the anion exchange polymer; 2) casting a layer of the anion exchange polymer membrane casting solution onto a supporting substrate; 3) evaporating the solvent and non-solvent from the surface of the coated layer and then coagulating the coated polymer layer in a coagulating bath to form the integrally-skinned asymmetric membrane structure; 5) drying the membrane at 50° C. to 150° C., or at 50° C. to 120° C., or at 80° C. to 120° C.; and optionally 6) ion exchanging the halide anions of the anion exchange polymer in the membrane with hydroxide, bicarbonate, carbonate ions, or a combination thereof to form the integrally-skinned asymmetric anion exchange polymer membrane. In some embodiments, the supporting substrate is removed from the membrane when the membrane is used in a desired application. In some embodiments, the supporting substrate is part of the final integrally-skinned asymmetric anion exchange polymer membrane. The supporting substrate may comprise polyolefin such as polypropylene and polyethylene, polyester, polyamide such as Nylon 6 and Nylon 6,6, cellulose, or fluorocarbon-based polymer such as PTFE and PVDF. The solvents for the preparation of the integrally-skinned asymmetric membrane include, but are not limited to, NMP, DMAc, DMF, DMSO, dioxanes, 1,3-dioxolane, and mixtures thereof. The non-solvents for the preparation of the integrally-skinned asymmetric membrane include, but are not limited to, acetone, methanol, ethanol, tetrahydrofuran (THF), toluene, n-octane, n-decane, lactic acid, citric acid, isopropanol, and mixtures thereof. The integrally-skinned asymmetric membrane may have a thin nonporous dense layer less than 500 nm on a microporous support layer.

In some embodiments, the reinforced composite anion exchange membrane is prepared using a method comprising: 1) dissolving the anion exchange polymer in a solvent to form a polymer solution; 2) impregnating a porous matrix support membrane with the anion exchange polymer solution to fill the pores with the anion exchange polymer via dip-coating, soaking, spraying, painting, or other known conventional solution impregnating method; 3) drying the impregnated membrane at 50° C. to 150° C., or at 50° C. to 120° C., or at 80° C. to 120° C.; and optionally 4) ion exchanging the halide anions of the anion exchange polymer in the pores of the reinforced membrane with hydroxide, bicarbonate, carbonate ions, or a combination thereof to form the reinforced composite anion exchange membrane with interconnected anion exchange polymer domains in a porous matrix. The solvents for the preparation of the thin film composite anion exchange membrane include, but are not limited to, NMP, DMAc, DMF, DMSO, dioxanes, 1,3-dioxolane, and mixtures thereof. The porous matrix should have good thermal stability (stable up to at least 120° C.), high stability under high pH condition (e.g., pH greater than 8), high resistance to oxidizing and reducing conditions (insoluble and no performance drop under oxidizing and reducing conditions), high mechanical strength (no dimensional change under the system operation conditions), as well as other factors dictated by the operating conditions for electrochemical reactions. The porous matrix must be compatible with the electrochemical cell chemistry and meet the mechanical demands of cell stacking or winding assembly operations.

The polymers suitable for the preparation of the porous matrix can be selected from, but not limited to, polyolefins such as polyethylene and polypropylene, polyamide such as Nylon 6 and Nylon 6,6, polyester, cellulose acetate, polybenzimidazole, fluorocarbon-based polymer such as PTFE and PVDF, polycarbonate, cellulose, or combinations thereof. These polymers provide a range of properties such as low cost, high stability in alkaline water, good mechanical stability, and ease of processability for porous matrix fabrication.

The porous matrix can either a non-woven matrix or a woven matrix and have either a symmetric porous structure or an asymmetric porous structure. The porous matrix can be formed by an electrospinning process, a phase inversion membrane fabrication approach followed by direct air drying, or by phase inversion followed by solvent exchange methods. The porous matrix also can be fabricated via a dry processing of thermoplastic polyolefins or a wet processing of thermoplastic olefins. The dry processing of thermoplastic polyolefins utilizes extrusion to bring the polymer above its melting point and form it into the desired shape. Subsequent annealing and stretching processes may also be done to increase the crystallinity and orientation and dimension of the pores. The wet processing of polyolefin porous matrix is done with the aid of a hydrocarbon liquid or low molecular weight oil mixed with the polymer resin or a mixture of the polymer resin and inorganic nanoparticles in the melt phase. The melt mixture is extruded through a die similar to the dry processed separators. The thickness of the porous matrix can be in a range of 10-400 micrometers, or a range of 10-200 micrometers, or a range of 10-100 micrometers, or a range of 20-100 micrometers. The pore size of the porous matrix can be in a range of 1 micrometer to 500 micrometers, or a range of 10 micrometer to 200 micrometers, or a range of 50 micrometers to 100 micrometer.

In some embodiments, the thin film composite anion exchange membrane is prepared using a method comprising: 1) dissolving the anion exchange polymer in a solvent to form a polymer coating solution; 2) coating a layer of the anion exchange polymer coating solution on one surface of a microporous support membrane via dip-coating, meniscus coating, spin coating, casting, soaking, spraying, painting, or other known conventional solution coating technologies; 3) drying the coated membrane at 50° C. to 150° C., or at 50° C. to 120° C., or at 80° C. to 120° C.; and optionally 4) ion exchanging the halide anions of the anion exchange polymer in the coating layer with hydroxide, bicarbonate, carbonate ions, or a combination thereof to form the thin film composite anion exchange membrane. The solvents for the preparation of the thin film composite anion exchange membrane include, but are not limited to, NMP, DMAc, DMF, DMSO, dioxanes, 1,3-dioxolane, and mixtures thereof. The microporous support membrane should have good thermal stability (stable up to at least 120° C.), high stability under high pH condition (e.g., pH greater than 8), high resistance to oxidizing and reducing conditions (insoluble and no performance drop under oxidizing and reducing conditions), high mechanical strength (no dimensional change under the system operation conditions), as well as other factors dictated by the operating conditions for electrochemical reactions. The microporous support membrane must be compatible with the electrochemical cell chemistry and meet the mechanical demands of cell stacking or winding assembly operations.

The polymers suitable for the preparation of the microporous support membrane can be selected from, but not limited to, polyolefins such as polyethylene and polypropylene, polyamide such as Nylon 6 and Nylon 6,6, polyester, cellulose acetate, polybenzimidazole, fluorocarbon-based polymer such as PTFE and PVDF, polycarbonate, cellulose, or combinations thereof. These polymers provide a range of properties such as low cost, high stability in alkaline water, good mechanical stability, and ease of processability for membrane fabrication.

The microporous support membrane can have either a symmetric porous structure or an asymmetric porous structure. The asymmetric microporous support membrane can be formed by a phase inversion membrane fabrication approach followed by direct air drying, or by phase inversion followed by solvent exchange methods. The microporous support membrane also can be fabricated via a dry processing of thermoplastic polyolefins or a wet processing of thermoplastic olefins. The dry processing of thermoplastic polyolefins utilizes extrusion to bring the polymer above its melting point and form it into the desired shape. Subsequent annealing and stretching processes may also be done to increase the crystallinity and orientation and dimension of the micropores. The wet processing of polyolefin separators is done with the aid of a hydrocarbon liquid or low molecular weight oil mixed with the polymer resin or a mixture of the polymer resin and inorganic nanoparticles in the melt phase. The melt mixture is extruded through a die similar to the dry processed separators. The thickness of the microporous support membrane can be in a range of 10-400 micrometers, or a range of 10-200 micrometers, or a range of 10-100 micrometers, or a range of 20-100 micrometers. The pore size of the microporous membrane can be in a range of 10 nanometers to 50 micrometers, or a range of 50 nanometers to 10 micrometers, or a range of 0.2 micrometers to 1 micrometer.

Another aspect of the invention is a membrane electrode assembly. In one embodiment, the membrane electrode assembly comprises: an anion exchange membrane comprising the polymer described above; an anode comprising an anode catalyst on a first surface of the anion exchange membrane; and a cathode comprising a cathode catalyst on a second surface of the anion exchange membrane; and In some embodiments, the membrane electrode assembly further comprises: an anode gas diffusion layer adjacent to the anode; and a cathode gas diffusion layer adjacent to the cathode. In some embodiments, the anode and the cathode catalysts are platinum group metal (PGM)-free electrocatalysts. The anode and the cathode catalysts are for oxygen evolution reaction and hydrogen evolution reaction, respectively. The anode and the cathode catalysts should have low cost, good electrical conductivity, and good electrocatalytic activity and stability. Suitable cathode catalysts can be selected from, but are not limited to, Ni-based alloys such as Ni—Mo, Ni—Al, Ni—Cr, Ni—Sn, Ni—Co, Ni—W, and Ni—Al—Mo, metal carbides such as $Mo_2C$, metal phosphides such as CoP, metal dichalcogenides such as $MoSe_2$, and mixtures thereof. Suitable anode catalysts can be selected from, but are not limited to, Ni—Fe alloy, Ni—Mo alloy, spinel $Cu_xCo_{3x}O_3$, Ni—Fe layered double hydroxide nanoplates on carbon nanotubes, immobilized metal catalyst on conductive supports, and mixtures thereof.

In some embodiments, the anode comprising an anode catalyst on a first surface of the anion exchange membrane is formed by coating an anode catalyst ink on the first surface of the anion exchange membrane via meniscus coating, knife coating, spray coating, painting, or other known conventional ink coating technologies, followed by drying the coated anion exchange membrane.

In some embodiments, the cathode comprising a cathode catalyst on a second surface of the anion exchange membrane is formed by coating a cathode catalyst ink on the second surface of the anion exchange membrane via meniscus coating, knife coating, spray coating, painting, or other known conventional ink coating technologies, followed by drying the coated anion exchange membrane.

In some embodiments, the anode catalyst ink comprises the anode catalyst, an $OH^-$ exchange ionomer as a binder, and a solvent. In some embodiments, the cathode catalyst ink comprises the cathode catalyst, an $OH^-$ exchange ionomer as a binder, and a solvent. The $OH^-$ exchange ionomer binder creates $OH^-$ transport pathways between the membrane and the reaction sites within the electrodes and thus drastically improves the utilization of the electrocatalyst particles while reducing the internal resistance. The $OH^-$ exchange ionomer binder can have a chemical structure similar to the anion exchange polymer described above, so that the binder will allow low interfacial resistance and similar expansion in contact with water to avoid catalyst delamination, but $OH^-$ conductivity and high oxygen and hydrogen permeance. The solvent can be selected from, but is not limited to, water, alcohol, or a mixture thereof.

The anode gas diffusion layer and the cathode gas diffusion layer simultaneously transport electrons, heat, and products with minimum voltage, current, thermal, interfacial, and fluidic losses. The cathode gas diffusion layer can be made from, but is not limited to, stainless steel, titanium meshes, titanium felts, titanium foams, or carbon-based materials such as non-woven carbon paper, non-woven carbon cloth, or woven carbon cloth. The anode gas diffusion layer can be made from, but is not limited to, stainless steel, titanium meshes, titanium felts, or titanium foams.

EXAMPLES

The following examples are provided to illustrate one or more preferred embodiments of the invention but are not limited embodiments thereof. Numerous variations can be made to the following examples that lie within the scope of the invention.

Example 1: Synthesis of poly(2,2-dihydroxybiphenyl-p-terphenyl-N,N-dimethyl-4-piperidinium iodide) Anion Exchange Polymer (Abbreviated as 2,2-DHB-TP-DMPI)

Figure 3:
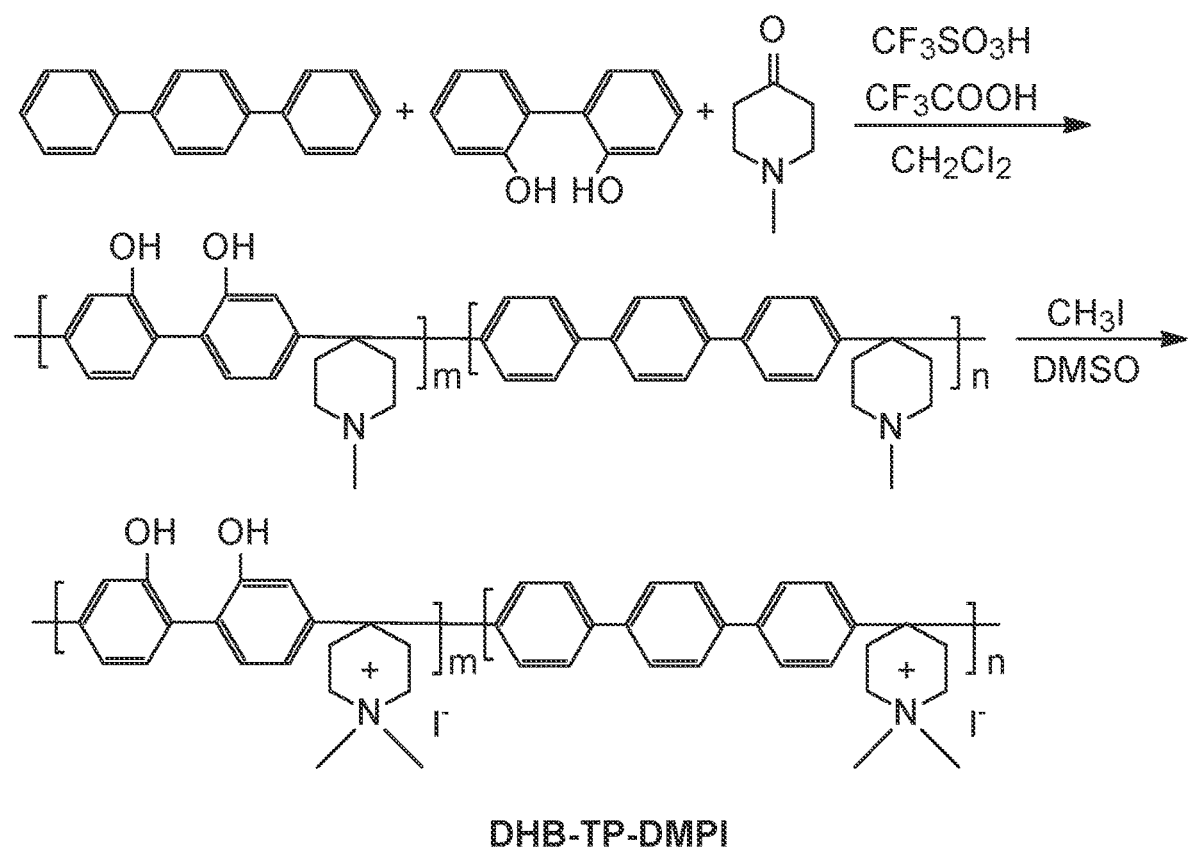
FIG. 3 is an illustration of one embodiment of the synthesis of a DHB-TP-DMPI anion exchange polymer.

A poly(2,2-dihydroxybiphenyl-p-terphenyl-N,N-dimethyl-4-piperidinium iodide) anion exchange polymer (abbreviated as 2,2-DHB-TP-DMPI) was synthesized via a two-step process as showed in FIG. 3: 1) a superacid catalyzed polyhydroxyalkylation reaction of monomers 2,2-dihydroxybiphenyl and p-terphenyl with N-methyl-4-piperidone to form a neutral precursor poly(2,2-dihydroxybiphenyl-p-terphenyl-N-methyl-4-piperidine) polymer; and 2) a Menshutkin reaction to convert the neutral precursor poly(2,2-dihydroxybiphenyl-p-terphenyl-N-methyl-4-piperidine) polymer to 2,2-DHB-TP-DMPI anion exchange polymer.

N-methyl-4-piperidone (11.88 g, 105 mmol), 2,2-dihydroxybiphenyl (2.80 g, 15 mmol) and p-terphenyl (19.6 g, 85 mmol) were dissolved into methylene chloride (75 mL) in a 250 mL three-necked flask equipped with an overhead mechanical stirrer. A mixture of TFA (6 ml) and TFSA (75 ml) were then added dropwise slowly at 0° C. Thereafter, the reaction was continued for 24 h. The resulting viscous, dark blue solution was poured slowly into ethanol. The resulting light-yellow solid was filtered, washed with water, and immersed in 0.5 M KOH aqueous solution overnight. The polymer was filtered, washed with water, and dried completely at 60° C. under vacuum to form a neutral precursor poly(2,2-dihydroxybiphenyl-p-terphenyl-N-methyl-4-piperidine) polymer. The yield of poly(2,2-dihydroxybiphenyl-p-terphenyl-N-methyl-4-piperidine) was about 98%.

The neutral precursor poly(2,2-dihydroxybiphenyl-p-terphenyl-N-methyl-4-piperidine) polymer (10.0 g) was dissolved in DMSO (90 mL) in a 200 mL wide mouth glass bottle equipped with a mechanical stirrer. Methyl iodide (10 mL) was added quickly. The solution was stirred for 20 h at room temperature and additional 2 h at 60° C. The resulting light-yellow solution was added slowly to pure water. The solid was filtered, washed with water, and dried completely at 80° C. under vacuum to form 2,2-DHB-TP-DMPI anion exchange polymer. The yield of 2,2-DHB-TP-DMPI was about 98%.

Example 2: Preparation of poly(2,2-dihydroxybiphenyl-p-terphenyl-N,N-dimethyl-4-piperidinium hydroxide) Anion Exchange Polymer Nonporous Dense Film Membrane (Abbreviated as 2,2-DHB-TP-DMPH)

A poly(2,2-dihydroxybiphenyl-p-terphenyl-N,N-dimethyl-4-piperidinium hydroxide) anion exchange polymer nonporous dense film membrane (abbreviated as 2,2-DHB-TP-DMPH) was prepared by dissolving the 2,2-DHB-TP-DMPI anion exchange polymer (5.0 g) in DMSO (20 g), casting the solution on a clean glass plate, and drying at 60° C. overnight. The membrane was peeled off from the glass plate and further dried in a vacuum oven at 100° C. for 48 h. The membrane was ion exchanged in 1 M KOH aqueous solution for 10 h to convert 2,2-DHB-TP-DMPI anion exchange polymer with I$^-$ anions to poly(2,2-dihydroxybiphenyl-p-terphenyl-N,N-dimethyl-4-piperidinium hydroxide) anion exchange polymer with OH$^-$ anions to form poly(2,2-dihydroxybiphenyl-p-terphenyl-N,N-dimethyl-4-piperidinium hydroxide) anion exchange polymer nonporous dense film membrane (abbreviated as 2,2-DHB-TP-DMPH). The in-plane hydroxide conductivity of the 2,2-DHB-TP-DMP membrane was 108.2 mS/cm at room temperature.

Example 3: Synthesis of poly(4,4-dihydroxybiphenyl-p-terphenyl-N,N-dimethyl-4-piperidinium iodide) Anion Exchange Polymer (Abbreviated as 4,4-DHB-TP-DMPI)

A poly(4,4-dihydroxybiphenyl-p-terphenyl-N,N-dimethyl-4-piperidinium iodide) anion exchange polymer (abbreviated as 4,4-DHB-TP-DMPI) was synthesized via a two-step process: 1) a superacid catalyzed polyhydroxyalkylation reaction of monomers 4,4-dihydroxybiphenyl and p-terphenyl with N-methyl-4-piperidone to form a neutral precursor poly(4,4-dihydroxybiphenyl-p-terphenyl-N-methyl-4-piperidine) polymer; and 2) a Menshutkin reaction to convert the neutral precursor poly(4,4-dihydroxybiphenyl-p-terphenyl-N-methyl-4-piperidine) polymer to 4,4-DHB-TP-DMPI anion exchange polymer.

N-methyl-4-piperidone (11.88 g, 105 mmol), 4,4-dihydroxybiphenyl (2.80 g, 15 mmol) and p-terphenyl (19.6 g, 85 mmol) were dissolved into methylene chloride (75 mL) in a 250 mL three-necked flask equipped with an overhead mechanical stirrer. A mixture of TFA (6 ml) and TFSA (75 ml) were then added dropwise slowly at 0° C. Thereafter, the reaction was continued for 24 h. The resulting viscous, dark blue solution was poured slowly into ethanol. The resulting light-yellow solid was filtered, washed with water, and immersed in 0.5 M KOH aqueous solution overnight. The polymer was filtered, washed with water, and dried completely at 60° C. under vacuum to form a neutral precursor poly(4,4-dihydroxybiphenyl-p-terphenyl-N-methyl-4-piperidine) polymer. The yield of poly(4,4-dihydroxybiphenyl-p-terphenyl-N-methyl-4-piperidine) was about 99%.

The neutral precursor poly(4,4-dihydroxybiphenyl-p-terphenyl-N-methyl-4-piperidine) polymer (10.0 g) was dissolved in DMSO (90 mL) in a 200 mL wide mouth glass bottle equipped with a mechanical stirrer. Methyl iodide (10 mL) was added quickly. The solution was stirred for 20 h at room temperature and additional 2 h at 60° C. The resulting light-yellow solution was added slowly to pure water. The off-white solid was filtered, washed with water, and dried completely at 80° C. under vacuum to form 4,4-DHB-TP-DMPI anion exchange polymer. The yield of 4,4-DHB-TP-DMPI was about 99%.

Example 4: Preparation of poly(4,4-dihydroxybiphenyl-p-terphenyl-N,N-dimethyl-4-piperidinium hydroxide) Anion Exchange Polymer Nonporous Dense Film Membrane (Abbreviated as 4,4-DHB-TP-DMPH)

A poly(4,4-dihydroxybiphenyl-p-terphenyl-N,N-dimethyl-4-piperidinium hydroxide) anion exchange polymer nonporous dense film membrane (abbreviated as 4,4-DHB-TP-DMPH) was prepared by dissolving the 4,4-DHB-TP-DMPI anion exchange polymer (5.0 g) in DMSO (20 g), casting the solution on a clean glass plate, and drying at 60° C. overnight. The membrane was peeled off from the glass plate and further dried in a vacuum oven at 100° C. for 48 h. The membrane was ion exchanged in 1 M KOH aqueous solution for 10 h to convert 4,4-DHB-TP-DMPI anion exchange polymer with I$^-$ anions to poly(4,4-dihydroxybiphenyl-p-terphenyl-N,N-dimethyl-4-piperidinium hydroxide) anion exchange polymer with OH$^-$ anions to form poly(4,4-dihydroxybiphenyl-p-terphenyl-N,N-dimethyl-4-piperidinium hydroxide) anion exchange polymer nonporous dense film membrane (abbreviated as 4,4-DHB-TP-DMPH). The in-plane hydroxide conductivity of the 4,4-DHB-TP-DMP membrane was 72 mS/cm at room temperature.

Example 5: Synthesis of poly(1,1'-bi-2-naphthol-p-terphenyl-N,N-dimethyl-4-piperidinium iodide) Anion Exchange Polymer (Abbreviated as 1,1-BN-TP-DMPI)

A poly(1,1'-bi-2-naphthol-p-terphenyl-N,N-dimethyl-4-piperidinium iodide) anion exchange polymer (abbreviated as 1,1-BN-TP-DMPI) was synthesized via a two-step process: 1) a superacid catalyzed polyhydroxyalkylation reaction of monomers 1,1'-bi-2-naphthol and p-terphenyl with N-methyl-4-piperidone to form a neutral precursor poly(1,1'-bi-2-naphthol-p-terphenyl-N-methyl-4-piperidine) polymer; and 2) a Menshutkin reaction to convert the neutral precursor poly(1,1'-bi-2-naphthol-p-terphenyl-N-methyl-4-piperidine) polymer to 1,1-BN-TP-DMPI anion exchange polymer.

N-methyl-4-piperidone (11.88 g, 105 mmol), 1,1'-bi-2-naphthol (4.29 g, 15 mmol) and p-terphenyl (19.6 g, 85 mmol) were dissolved into methylene chloride (75 mL) in a 250 mL three-necked flask equipped with an overhead mechanical stirrer. A mixture of TFA (6 ml) and TFSA (75 ml) were then added dropwise slowly at room temperature. Thereafter, the reaction was continued for 24 h. The resulting viscous solution was poured slowly into ethanol. The resulting solid was filtered, washed with water, and immersed in 0.5 M KOH aqueous solution overnight. The polymer was filtered, washed with water, and dried completely at 60° C. under vacuum to form a neutral precursor poly(1,1'-bi-2-naphthol-p-terphenyl-N-methyl-4-piperidine) polymer. The yield of poly(1,1'-bi-2-naphthol-p-terphenyl-N-methyl-4-piperidine) was about 96%.

The neutral precursor poly(1,1'-bi-2-naphthol-p-terphenyl-N-methyl-4-piperidine) polymer (10.0 g) was dissolved in DMSO (90 mL) in a 200 mL wide mouth glass bottle equipped with a mechanical stirrer. Methyl iodide (10 mL) was added quickly. The solution was stirred for 20 h at room temperature and additional 2 h at 60° C. The resulting solution was added slowly to pure water. The solid was filtered, washed with water, and dried completely at 80° C. under vacuum to form 1,1-BN-TP-DMPI anion exchange polymer. The yield of 1,1-BN-TP-DMPI was about 97%.

Example 6: Preparation of poly(1,1'-bi-2-naphthol-p-terphenyl-N,N-dimethyl-4-piperidinium hydroxide) Anion Exchange Polymer Nonporous Dense Film Membrane (Abbreviated as 1,1-BN-TP-DMPH)

A poly(1,1'-bi-2-naphthol-p-terphenyl-N,N-dimethyl-4-piperidinium hydroxide) anion exchange polymer nonporous dense film membrane (abbreviated as 1,1-BN-TP-DMPH) was prepared by dissolving the 1,1-BN-TP-DMPI anion exchange polymer (5.0 g) in DMSO (20 g), casting the solution on a clean glass plate, and drying at 60° C. overnight. The membrane was peeled off from the glass plate and further dried in a vacuum oven at 100° C. for 48 h. The membrane was ion exchanged in 1 M KOH aqueous solution for 10 h to convert 1,1-BN-TP-DMPI anion exchange polymer with I$^-$ anions to poly(1,1'-bi-2-naphthol-p-terphenyl-N,N-dimethyl-4-piperidinium hydroxide) anion exchange polymer with OH$^-$ anions to form poly(1,1'-bi-2-naphthol-p-terphenyl-N,N-dimethyl-4-piperidinium hydroxide) anion exchange polymer nonporous dense film membrane (abbreviated as 1,1-BN-TP-DMPH). The in-plane hydroxide conductivity of the 1,1-BN-TP-DMPH membrane was 96.5 mS/cm at room temperature.

Specific Embodiments

While the following is described in conjunction with specific embodiments, it will be understood that this description is intended to illustrate and not limit the scope of the preceding description and the appended claims.

A first embodiment of the invention is a polymer comprising a plurality of repeating units of formula (I)

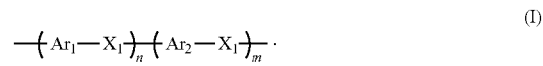

(I)

wherein $Ar_1$ is selected from the group consisting of.

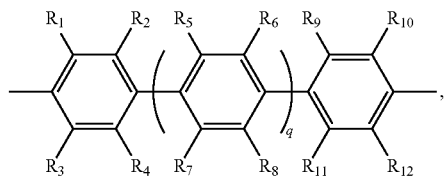

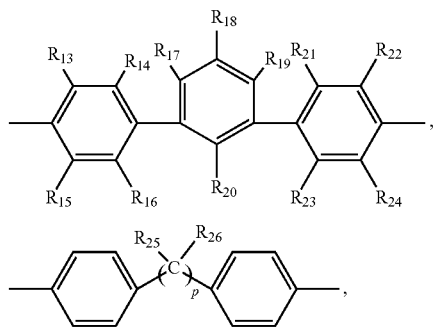

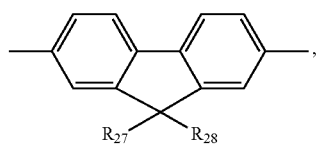

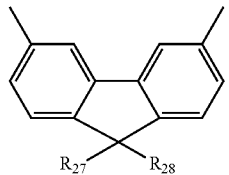

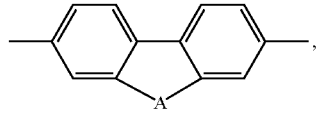

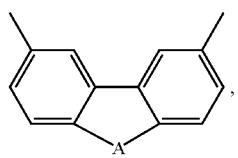

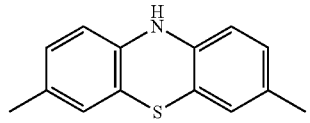

and mixtures thereof; Ar₂ is selected from the group consisting of:

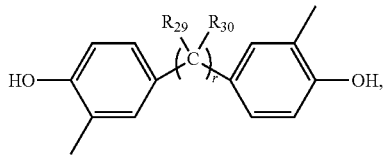

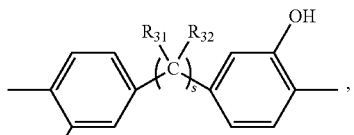

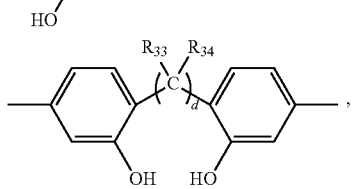

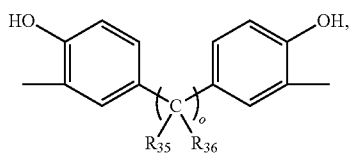

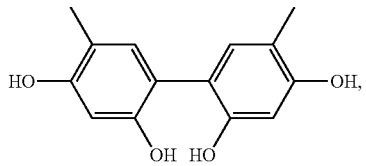

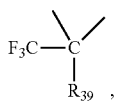, 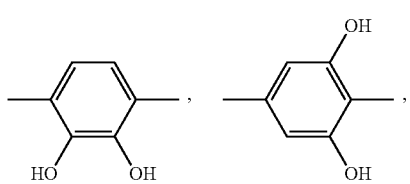

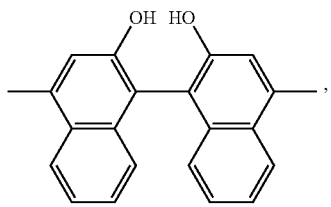

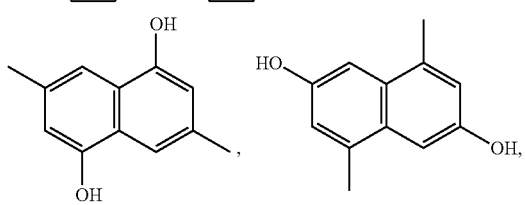

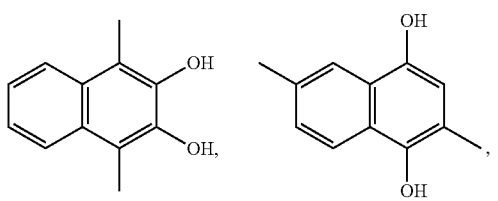

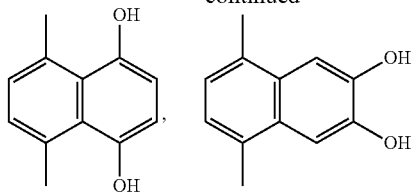

and mixtures thereof; $X_1$ is selected from the group consisting of:

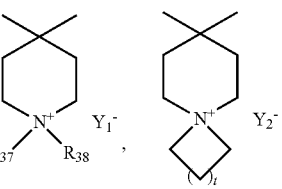

optionally

F₃C—C(R₃₉)(—)(—) , and mixtures thereof, wherein $Y_1^-$ and $Y_2^-$ are anions; wherein $R_1$-$R_{36}$ are each independently hydrogen, a halide, an alkyl group, an alkenyl group, an alkynyl group, or an aryl group, and the alkyl, alkenyl, alkynyl, or aryl groups are optionally substituted with a halide or a positively charged functional group; wherein $R_{37}$ and $R_{38}$ are each independently hydrogen, an alkyl group, an alkenyl group, an alkynyl group, or an aryl group, and the alkyl, alkenyl, alkynyl or aryl groups are optionally substituted with a halide or a positively charged functional group; wherein $R_{39}$ is an alkyl group, an alkenyl group, an alkynyl group, or an aryl group, and the alkyl, alkenyl, alkynyl or aryl group is optionally substituted with a halide or a positively charged functional group; wherein A is O or S; wherein m and n are independently integers from 5 to 500 and the molar ratio of n/m is in a range of 1:20 to 20:1; wherein p is 1, 2, 3, or 4; wherein q is 0, 1, 2, or 3; wherein r, s, d, and o are independently 0, 1, 2, or 3; and wherein t is 1, 2, 3, 4, 5, or 6. An embodiment of the invention is one, any or all of prior embodiments in this paragraph up through the first embodiment in this paragraph wherein $Ar_1$ is selected from the group consisting of

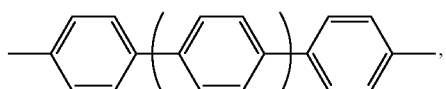

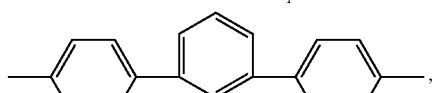

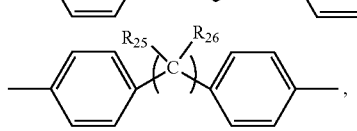

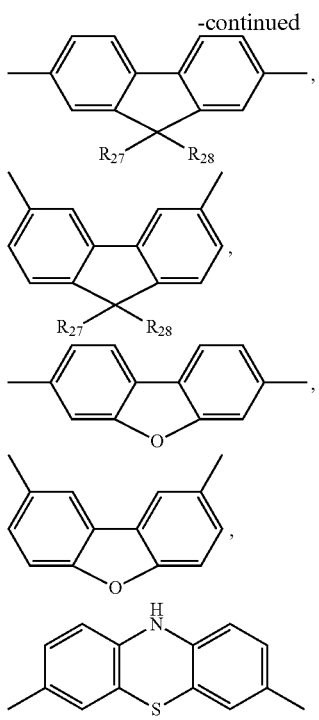

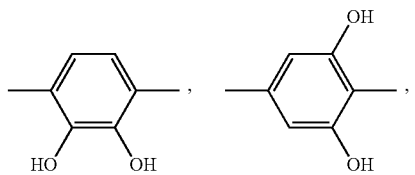

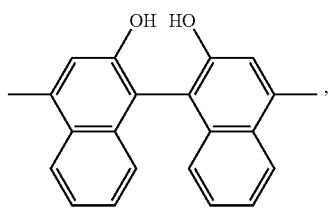

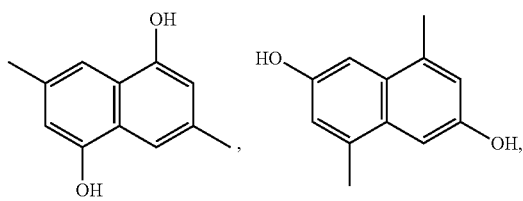

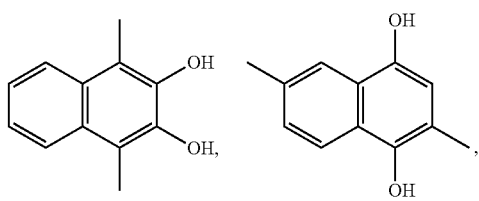

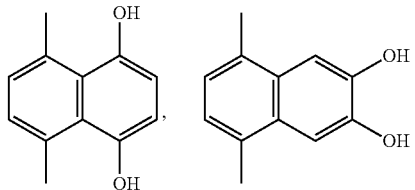

and mixtures thereof, wherein $R_{25}$, $R_{26}$, $R_{27}$, and $R_{28}$ are each independently —H or —$CH_3$; wherein p is 1 or 2; and wherein q is 0 or 1. An embodiment of the invention is one, any or all of prior embodiments in this paragraph up through the first embodiment in this paragraph wherein $Ar_2$ is selected from the group consisting of

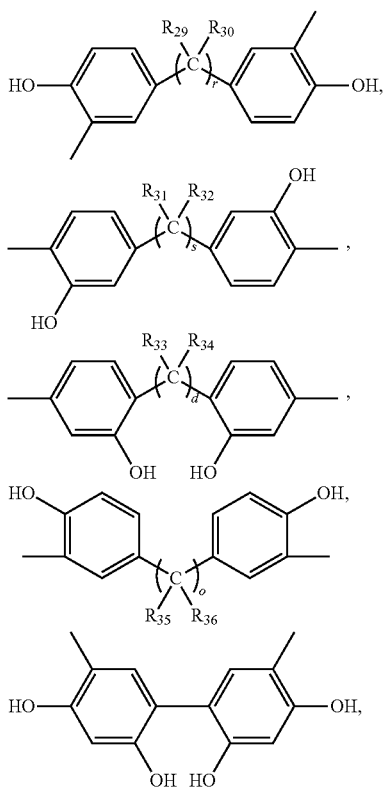

and mixtures thereof; wherein $R_{29}$, $R_{30}$, $R_{31}$, $R_{32}$, $R_{33}$, $R_{34}$, $R_{35}$, and $R_{36}$ are each independently —$CH_3$ or —$CF_3$; wherein r, s, d, and o are each independently 0 or 1. An embodiment of the invention is one, any or all of prior embodiments in this paragraph up through the first embodiment in this paragraph wherein $X_1$ is

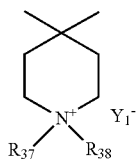

and wherein $R_{37}$ and $R_{38}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$, and wherein $Y_1^-$ is $OH^-$ or $I^-$. An embodiment of the invention is one, any or all of prior embodiments in this paragraph up through the first embodiment in this paragraph wherein $X_1$ is

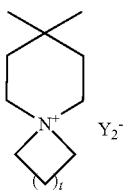

wherein t is 1, 2, 3, 4, 5, or 6, and wherein $Y_2^-$ is $OH^-$ or $I^-$. An embodiment of the invention is one, any or all of prior embodiments in this paragraph up through the first embodiment in this paragraph wherein $X_1$ is a mixture of

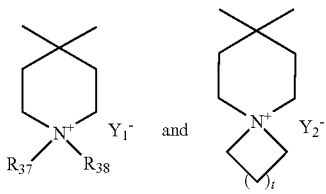

wherein $R_{37}$ and $R_{38}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$; wherein t is 1, 2, 3, 4, 5, or 6; and wherein $Y_1^-$ and $Y_2^-$ are the same and are selected from $OH^-$ or $I^-$. An embodiment of the invention is one, any or all of prior embodiments in this paragraph up through the first embodiment in this paragraph wherein $X_1$ is a mixture of

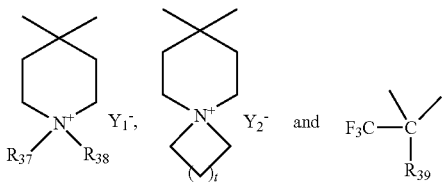

wherein $R_{37}$ and $R_{38}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$; wherein t is 1, 2, 3, 4, 5, or 6; wherein $Y_1^-$ and $Y_2^-$ are the same and are selected from $OH^-$ or $I^-$, and wherein $R_{39}$ is —$CH_3$, —$CH_2CH_3$, —$C_6H_5$, or —$(CH_2)_5$—$N^+(CH_3)_3$. An embodiment of the invention is one, any or all of prior embodiments in this paragraph up through the first embodiment in this paragraph wherein the polymer is synthesized from monomers $Ar_1'$, $Ar_2'$, and $X_1'$ wherein $Ar_1'$ is selected from the group consisting of.

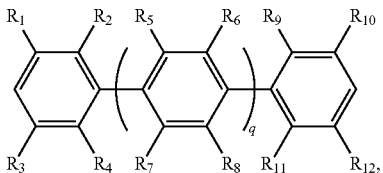

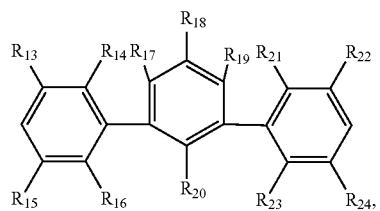

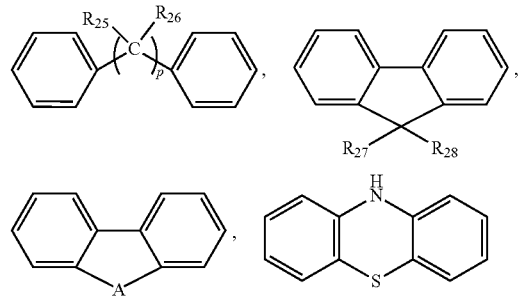

and mixtures thereof;

$Ar_2'$ is selected from the group consisting of:

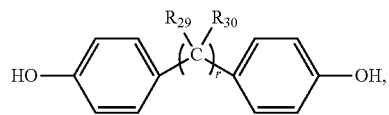

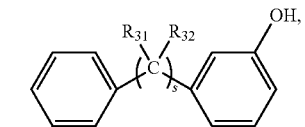

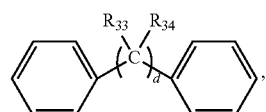

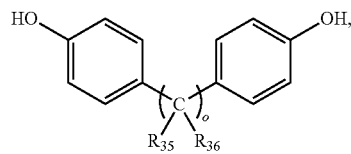

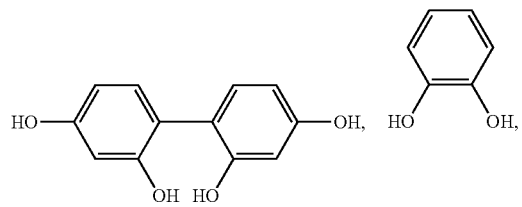

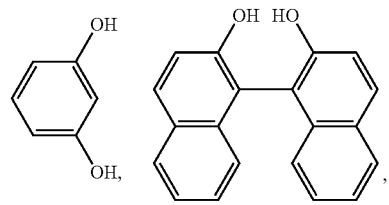

-continued

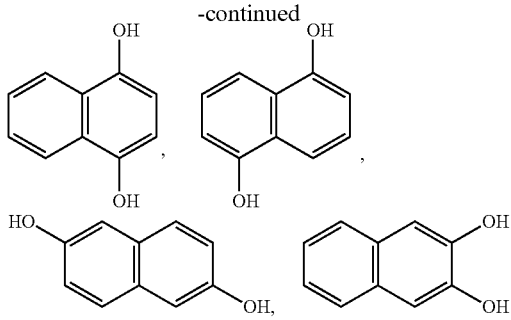

and mixtures thereof; and
$X_1'$ is selected from the group consisting of:

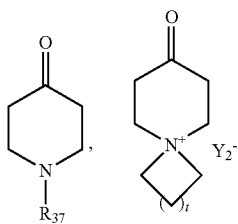

optionally

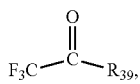

and mixtures thereof. An embodiment of the invention is one, any or all of prior embodiments in this paragraph up through the first embodiment in this paragraph wherein $Ar_1'$ is selected from the group consisting of

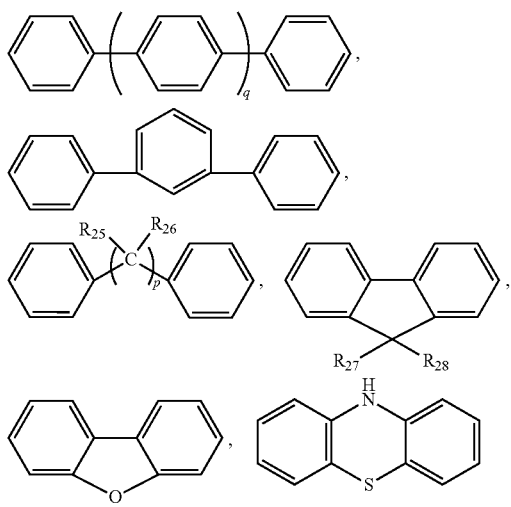

and mixtures thereof, wherein $R_{25}$, $R_{26}$, $R_{27}$, and $R_{28}$ are each independently —H or —$CH_3$; wherein p is 1 or 2; and wherein q is 0 or 1. An embodiment of the invention is one, any or all of prior embodiments in this paragraph up through the first embodiment in this paragraph wherein $Ar_2'$ is selected from the group consisting of

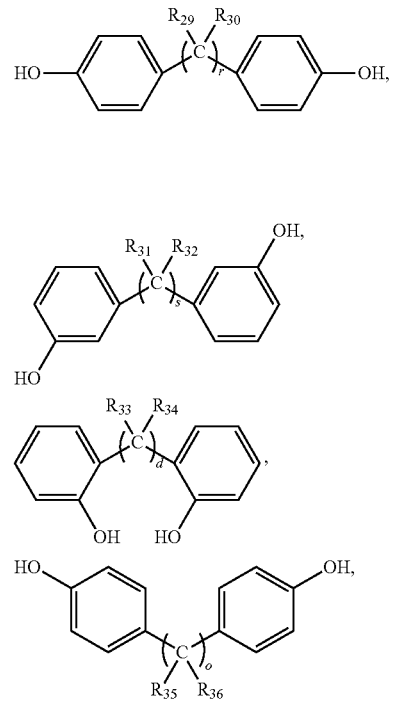

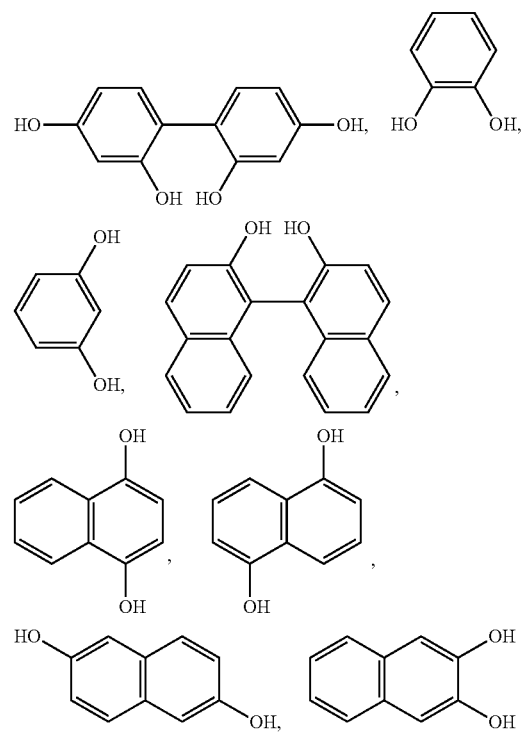

and mixtures thereof; wherein $R_{29}$, $R_{30}$, $R_{31}$, $R_{32}$, $R_{33}$, $R_{34}$, $R_{35}$, and $R_{36}$ are each independently —$CH_3$ or —$CF_3$; wherein r, s, d, and o are independent 0 or 1. An embodiment of the invention is one, any or all of prior embodiments in this paragraph up through the first embodiment in this paragraph wherein $X_1'$ is

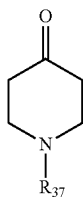

and wherein $R_{37}$ is —H, —CH$_3$, —CH$_2$CH$_3$, —CH(CH$_3$)$_2$, —C(CH$_3$)$_3$, —CH$_2$—C$_6$H$_5$, or —CH$_2$—CH(CH$_3$)$_2$. An embodiment of the invention is one, any or all of prior embodiments in this paragraph up through the first embodiment in this paragraph wherein $X_1'$ is

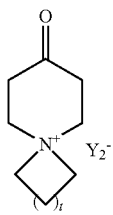

and wherein t is 1, 2, 3, 4, 5, or 6. An embodiment of the invention is one, any or all of prior embodiments in this paragraph up through the first embodiment in this paragraph wherein $X_1'$ is a mixture of

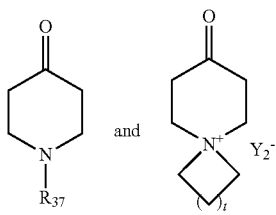

wherein $R_{37}$ is —H, —CH$_3$, —CH$_2$CH$_3$, —CH(CH$_3$)$_2$, —C(CH$_3$)$_3$, —CH$_2$—C$_6$H$_5$, or —CH$_2$—CH(CH$_3$)$_2$, and wherein t is 1, 2, 3, 4, 5, or 6. An embodiment of the invention is one, any or all of prior embodiments in this paragraph up through the first embodiment in this paragraph wherein $X_1'$ is a mixture of

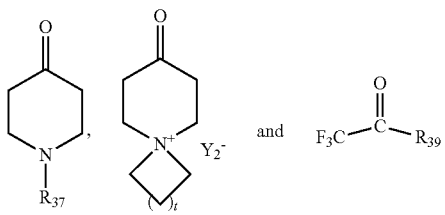

wherein $R_{37}$ is —H, —CH$_3$, —CH$_2$CH$_3$, —CH(CH$_3$)$_2$, —C(CH$_3$)$_3$, —CH$_2$—C$_6$H$_5$, or —CH$_2$—CH(CH$_3$)$_2$; wherein $R_{39}$ is —CH$_3$, —CH$_2$CH$_3$, —C$_6$H$_5$, or —(CH$_2$)$_5$—N$^+$(CH$_3$)$_3$; and wherein t is 1, 2, 3, 4, 5, or 6.

A second embodiment of the invention is an anion exchange membrane comprising the polymer described in the first embodiment. An embodiment of the invention is one, any or all of prior embodiments in this paragraph up through the second embodiment in this paragraph, wherein the anion exchange membrane is used in a fuel cell, an electrolyzer, a flow battery, an electrodialyzer, a waste metal recovery system, an electrocatalytic hydrogen production system, a desalinator, a water purifier, a waste water treatment system, an ion exchanger, or a CO$_2$ separator. An embodiment of the invention is one, any or all of prior embodiments in this paragraph up through the second embodiment in this paragraph wherein the anion exchange membrane comprises a nonporous symmetric dense film membrane, an integrally-skinned asymmetric membrane, a reinforced composite membrane, or a thin film composite membrane. An embodiment of the invention is one, any or all of prior embodiments in this paragraph up through the second embodiment in this paragraph wherein the integrally-skinned asymmetric membrane, the reinforced composite membrane, or the thin film composite membrane comprises a porous substrate membrane impregnated or coated with the polymer.

A third embodiment of the invention is a membrane electrode assembly, comprising an anion exchange membrane comprising the polymer of claim 1; an anode comprising an anode catalyst on a first surface of the anion exchange membrane; and a cathode comprising a cathode catalyst on a second surface of the anion exchange membrane. An embodiment of the invention is one, any or all of prior embodiments in this paragraph up through the third embodiment in this paragraph further comprising an anode gas diffusion layer adjacent to the anode; and a cathode gas diffusion layer adjacent to the cathode.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A polymer comprising a plurality of repeating units of formula (I)

wherein Ar$_1$ is selected from the group consisting of:

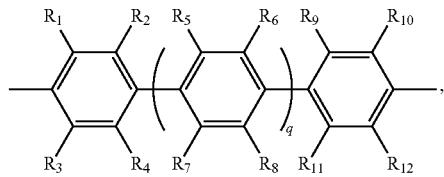

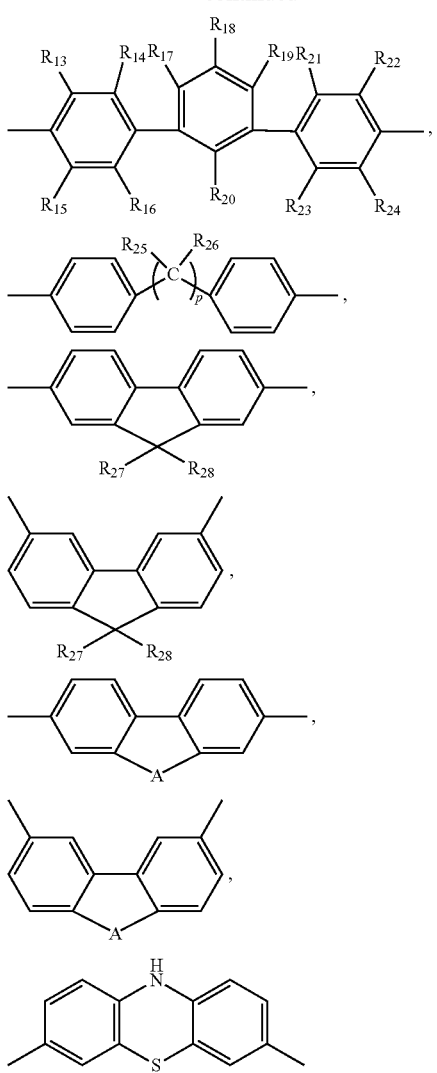
and mixtures thereof;
Ar₂ is selected from the group consisting of:
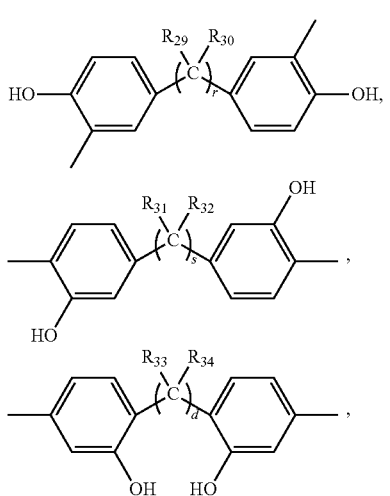
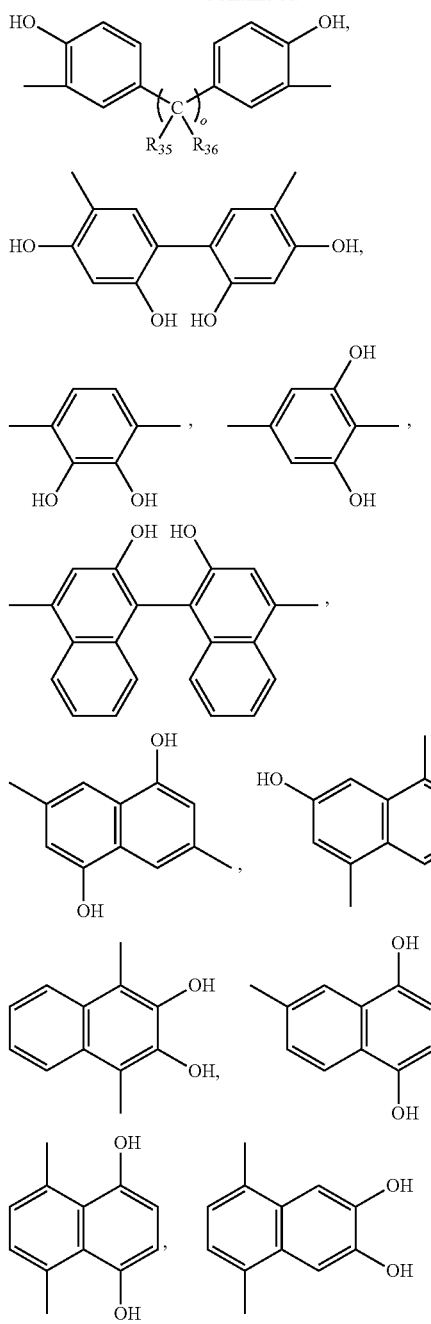
and mixtures thereof;
X₁ is selected from the group consisting of:
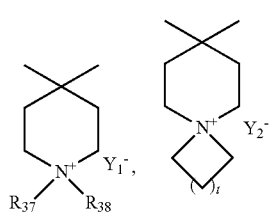

optionally

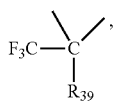

and mixtures thereof;

wherein $Y_1^-$ and $Y_2^-$ are anions;

wherein $R_1$-$R_{36}$ are each independently hydrogen, a halide, an alkyl group, an alkenyl group, an alkynyl group, or an aryl group, and the alkyl, alkenyl, alkynyl, or aryl groups are optionally substituted with a halide or a positively charged functional group;

wherein $R_{37}$ and $R_{38}$ are each independently hydrogen, an alkyl group, an alkenyl group, an alkynyl group, or an aryl group, and the alkyl, alkenyl, alkynyl or aryl groups are optionally substituted with a halide or a positively charged functional group;

wherein $R_{39}$ is an alkyl group, an alkenyl group, an alkynyl group, or an aryl group, and the alkyl, alkenyl, alkynyl or aryl group is optionally substituted with a halide or a positively charged functional group;

wherein A is O or S;

wherein m and n are independently integers from 5 to 500 and the molar ratio of n/m is in a range of 1:20 to 20:1;

wherein p is 1, 2, 3, or 4;

wherein q is 0, 1, 2, or 3;

wherein r, s, d, and o are independently 0, 1, 2, or 3; and wherein t is 1, 2, 3, 4, 5, or 6.

2. The polymer of claim 1 wherein $Ar_1$ is selected from the group consisting of

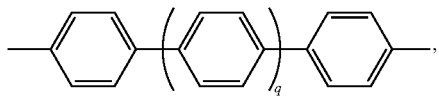

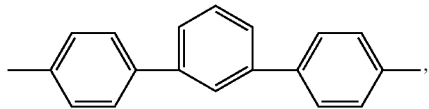

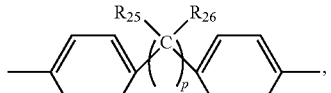

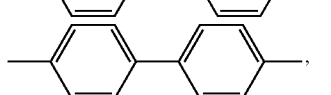

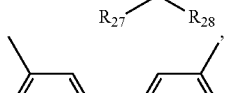

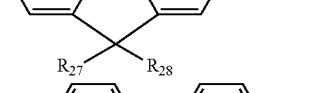

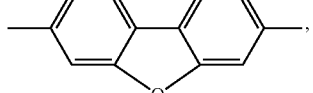

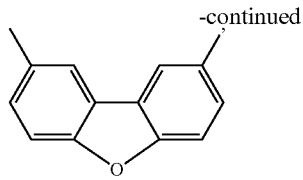

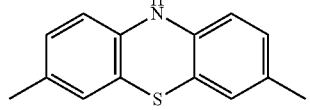

and mixtures thereof;

wherein $R_{25}$, $R_{26}$, $R_{27}$, and $R_{28}$ are each independently —H or —$CH_3$;

wherein p is 1 or 2; and wherein q is 0 or 1.

3. The polymer of claim 1 wherein Ar₂ is selected from the group consisting of

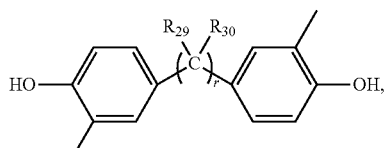

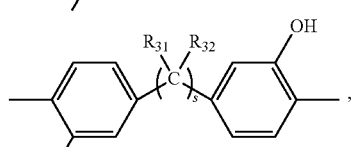

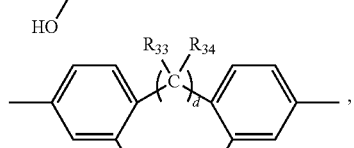

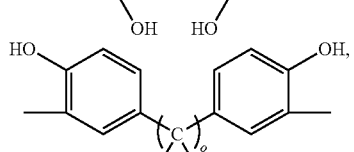

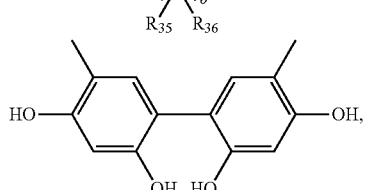

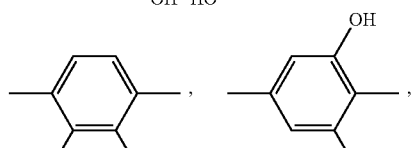

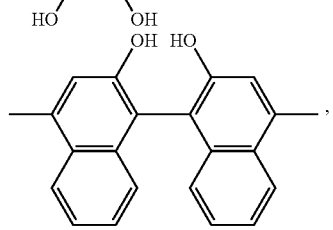

-continued

[chemical structures of substituted naphthalenediols]

and mixtures thereof;

wherein $R_{29}$, $R_{30}$, $R_{31}$, $R_{32}$, $R_{33}$, $R_{34}$, $R_{35}$, and $R_{36}$ are each independently —$CH_3$ or —$CF_3$; and wherein r, s, d, and o are each independently 0 or 1.

4. The polymer of claim 1 wherein $X_1$ is

[chemical structure with $R_{37}$, $R_{38}$, $Y_1^-$]

and wherein $R_{37}$ and $R_{38}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$; and wherein $Y_1^-$ is $OH^-$ or $I^-$.

5. The polymer of claim 1 wherein $X_1$ is

[chemical structure with $Y_2^-$ and $(\ )_t$]

wherein t is 1, 2, 3, 4, 5, or 6; and wherein $Y_2^-$ is $OH^-$ or $I^-$.

6. The polymer of claim 1 wherein $X_1$ is a mixture of

[two chemical structures] and wherein $R_{37}$ and $R_{38}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$;

wherein t is 1, 2, 3, 4, 5, or 6; and wherein $Y_1^-$ and $Y_2^-$ are the same and are selected from $OH^-$ or $I^-$.

7. The polymer of claim 1 wherein $X_1$ is a mixture of

[three chemical structures including one with $F_3C$—C—$R_{39}$] and wherein $R_{37}$ and $R_{38}$ are each independently —H, —$CH_3$, —$CH_2CH_3$, —$CH(CH_3)_2$, —$C(CH_3)_3$, —$CH_2$—$C_6H_5$, or —$CH_2$—$CH(CH_3)_2$;

wherein t is 1, 2, 3, 4, 5, or 6;

wherein $Y_1^-$ and $Y_2^-$ are the same and are selected from $OH^-$ or $I^-$; and wherein $R_{39}$ is —$CH_3$, —$CH_2CH_3$, —$C_6H_5$, or —$(CH_2)_5$—$N^+(CH_3)_3$.

8. The polymer of claim 1 wherein the polymer is synthesized from monomers $Ar_1'$, $Ar_2'$, and $X_1'$ wherein $Ar_1'$ is selected from the group consisting of:

[chemical structures with R groups $R_1$ through $R_{28}$]

-continued

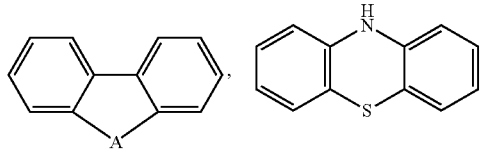

and mixtures thereof;
Ar$_2$' is selected from the group consisting of:

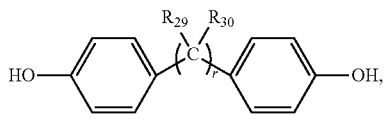

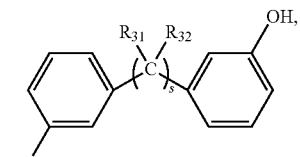

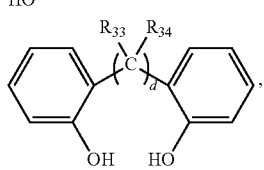

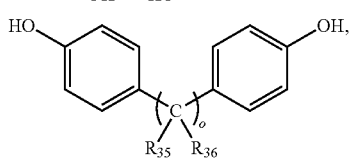

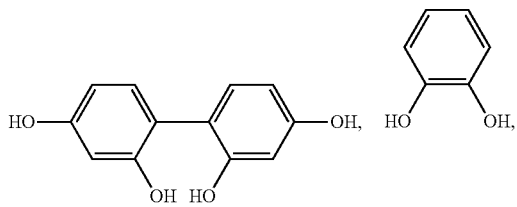

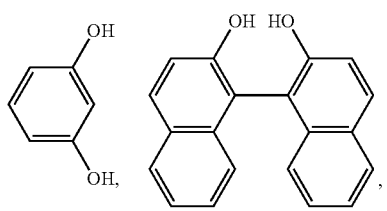

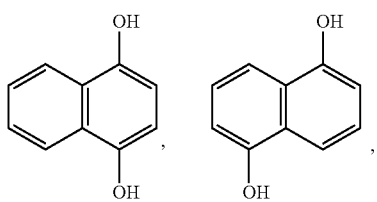

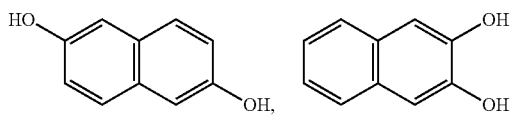

and mixtures thereof; and
X$_1$' is selected from the group consisting of:

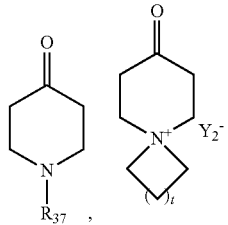

optionally

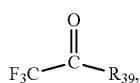

and mixtures thereof.

9. The polymer of claim 8 wherein Ar$_1$' is selected from the group consisting of:

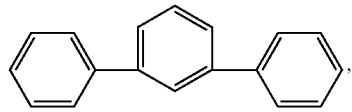

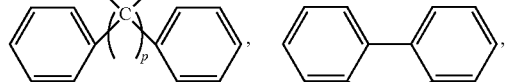

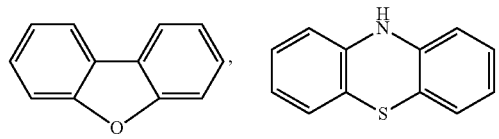

and mixtures thereof;
wherein R$_{25}$, R$_{26}$, R$_{27}$, and R$_{28}$ are each independently —H or —CH$_3$;
wherein p is 1 or 2; and
wherein q is 0 or 1.

10. The polymer of claim 8 wherein Ar$_2$' is selected from the group consisting of:

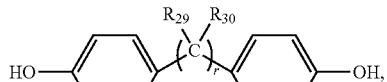

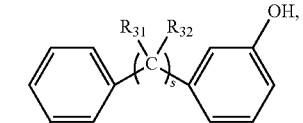

-continued

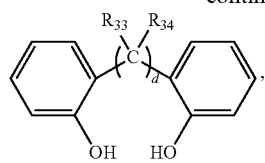

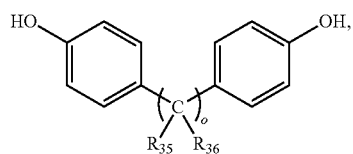

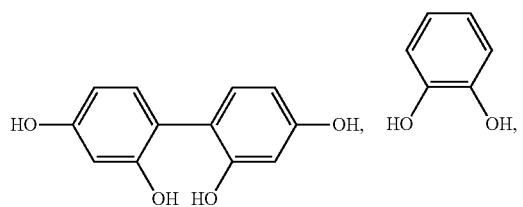

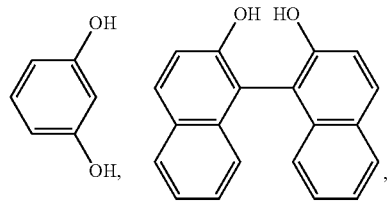

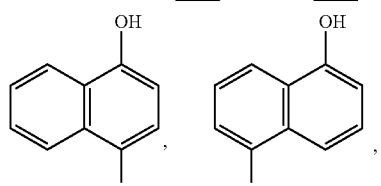

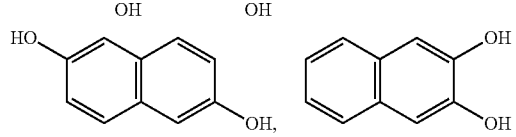

and mixtures thereof;

wherein $R_{29}$, $R_{30}$, $R_{31}$, $R_{32}$, $R_{33}$, $R_{34}$, $R_{35}$, and $R_{36}$ are each independently —$CH_3$ or —$CF_3$; and wherein r, s, d, and o are independent 0 or 1.

11. The polymer of claim 8 wherein $X_1'$ is

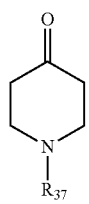

and wherein $R_{37}$ is —H, —$CH_3$, —$CH_2CH_3$, —CH$(CH_3)_2$, —C$(CH_3)_3$, —$CH_2$—$C_6H_5$, or —$CH_2$—CH$(CH_3)_2$.

12. The polymer of claim 8 wherein $X_1'$ is

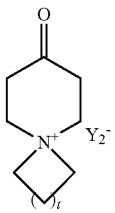

and wherein t is 1, 2, 3, 4, 5, or 6.

13. The polymer of claim 8 wherein $X_1'$ is a mixture of

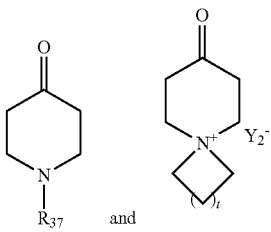

wherein $R_{37}$ is —H, —$CH_3$, —$CH_2CH_3$, —CH$(CH_3)_2$, —C$(CH_3)_3$, —$CH_2$—$C_6H_5$, or —$CH_2$—CH$(CH_3)_2$; and wherein t is 1, 2, 3, 4, 5, or 6.

14. The polymer of claim 8 wherein $X_1'$ is a mixture of

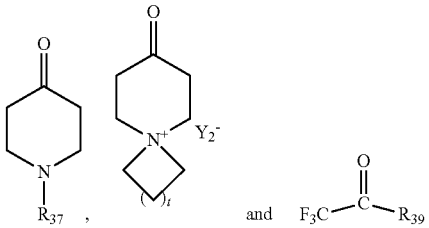

wherein $R_{37}$ is —H, —$CH_3$, —$CH_2CH_3$, —CH$(CH_3)_2$, —C$(CH_3)_3$, —$CH_2$—$C_6H_5$, or —$CH_2$—CH$(CH_3)_2$;

wherein $R_{39}$ is —$CH_3$, —$CH_2CH_3$, —$C_6H_5$, or —$(CH_2)_5$—$N^+(CH_3)_3$; and wherein t is 1, 2, 3, 4, 5, or 6.

15. An anion exchange membrane comprising the polymer of claim 1.

16. The anion exchange membrane of claim 15, wherein the anion exchange membrane is used in a fuel cell, an electrolyzer, a flow battery, an electrodialyzer, a waste metal recovery system, an electrocatalytic hydrogen production system, a desalinator, a water purifier, a waste water treatment system, an ion exchanger, or a $CO_2$ separator.

17. The anion exchange membrane of claim 15 wherein the anion exchange membrane comprises a nonporous symmetric dense film membrane, an integrally-skinned asymmetric membrane, a reinforced composite membrane, or a thin film composite membrane.

18. The anion exchange membrane of claim 17 wherein the integrally-skinned asymmetric membrane, the reinforced composite membrane, or the thin film composite membrane comprises a porous substrate membrane impregnated or coated with the polymer.

19. A membrane electrode assembly, comprising:
an anion exchange membrane comprising the polymer of claim 1;

an anode comprising an anode catalyst on a first surface of the anion exchange membrane; and a cathode comprising a cathode catalyst on a second surface of the anion exchange membrane.

20. The membrane electrode assembly of claim 19 further comprising:

an anode gas diffusion layer adjacent to the anode; and a cathode gas diffusion layer adjacent to the cathode.

\* \* \* \* \*